United States Patent [19]
Geller

[11] Patent Number: 5,772,332
[45] Date of Patent: Jun. 30, 1998

[54] CONTAINER HAVING A RECTANGULAR BASE AND ITS MANUFACTURING

[75] Inventor: Avner Geller, Tel-Aviv, Israel

[73] Assignee: Atifon Ltd., Holon, Israel

[21] Appl. No.: 666,279

[22] PCT Filed: Oct. 2, 1995

[86] PCT No.: PCT/US95/12264

§ 371 Date: Jun. 20, 1996

§ 102(e) Date: Jun. 20, 1996

[87] PCT Pub. No.: WO96/10524

PCT Pub. Date: Apr. 11, 1996

[30] Foreign Application Priority Data

Sep. 30, 1994 [IL] Israel ......................................... 111114

[51] Int. Cl.[6] .............................. B65D 30/18; B65D 33/02
[52] U.S. Cl. .......................... 383/119; 220/9.1; 383/104; 383/122; 493/218
[58] Field of Search .................................. 383/104, 122, 383/119, 33; 220/9.1; 493/218

[56] References Cited

U.S. PATENT DOCUMENTS

| 1,255,133 | 2/1918 | Carr | 383/122 |
|---|---|---|---|
| 1,648,890 | 11/1927 | Beasley | 383/119 |

(List continued on next page.)

FOREIGN PATENT DOCUMENTS

| 237936 | 3/1962 | Australia . | |
|---|---|---|---|
| 0 052 151 | 11/1980 | European Pat. Off. . | |
| 0 052 151 | 5/1982 | European Pat. Off. . | |
| 524487 | 1/1993 | European Pat. Off. | 383/104 |
| 1.077.359 | 11/1954 | France . | |
| 1431079 | 1/1966 | France | 383/121 |
| 348106 | 9/1960 | Germany . | |
| 24 40 491 | 8/1974 | Germany . | |
| 26 52 454 | 5/1978 | Germany . | |
| 26 52 454 A1 | 5/1978 | Germany . | |
| 28 01 851 | 6/1978 | Germany . | |
| 19201 | 2/1965 | Israel . | |
| 40-22240 | 3/1965 | Japan . | |
| 46-588 | 7/1971 | Japan . | |
| 51-153508 | 7/1976 | Japan . | |
| 54-2320 | 10/1978 | Japan . | |
| 57-44530 | 9/1982 | Japan . | |
| 62-501969 | 6/1988 | Japan . | |
| 5077838 | 3/1993 | Japan | 383/104 |
| 6-122456 | 8/1994 | Japan . | |
| 1 598 843 | 2/1981 | United Kingdom . | |
| 8912006 | 12/1989 | WIPO | 383/104 |
| 9008704 | 8/1990 | WIPO | 383/104 |

OTHER PUBLICATIONS

Israeli Search Report.
International Search Report.

*Primary Examiner*—Stephen P. Garbe
*Attorney, Agent, or Firm*—Wigman, Cohen, Leitner & Myers, P.C.

[57] ABSTRACT

A container is constructed from a pouch having a front sheet, a rear sheet and a bottom sheet. The bottom sheet of the pouch is folded along a midline thereof with flaps extending downward from the fold line. Each of the bottom edges of the flaps are welded to or integral with one bottom edge of either the front or the rear sheet. Lateral edges of the front and rear sheets are welded to one another with the bottom two portions of the welded edges sandwiching both lateral edges of the bottom folded sheet. To construct the container, a central portion of the bottom sheet is unfolded such that the unfolded portion has an essentially rectangular shape, thus forming said base, with central parts of the bottom edges of the bottom sheet forming the front and rear edges of the base and with peripheral portions of the bottom sheet forming two overlapping triangular portions with the bottom edges thereof defining the two side edges of the base. The container's front and rear wall sections extend from the front and rear edges and side walls extend from the side edges, with the welded edges of the front and rear sheets being at about the midline of the side walls. The structure is fixed by welding the two overlapping triangular portions to one another or by welding a peripheral triangular portion of the two overlapping ones to a juxtaposed inner face of the side sheets.

6 Claims, 20 Drawing Sheets

U.S. PATENT DOCUMENTS

| | | | |
|---|---|---|---|
| 1,671,050 | 5/1928 | Snyder | 383/119 |
| 2,143,957 | 1/1939 | Petter | 383/119 |
| 3,136,475 | 6/1964 | Geimer . | |
| 3,172,796 | 3/1965 | Gulker | 383/122 |
| 3,434,652 | 3/1969 | Shore | 383/119 |
| 3,462,067 | 8/1969 | Shore | 383/104 |
| 3,554,434 | 1/1971 | Anderson | 383/104 |
| 3,739,977 | 6/1973 | Shapiro | 383/104 |
| 3,743,172 | 7/1973 | Ackley et al. | 383/104 |
| 3,974,747 | 8/1976 | Tsukino . | |
| 3,980,225 | 9/1976 | Kan | 383/104 |
| 4,041,851 | 8/1977 | Jentsch | 393/121 |
| 4,353,497 | 10/1982 | Bustin . | |
| 4,361,235 | 11/1982 | Gautier | 383/104 |
| 4,377,192 | 3/1983 | Gautier . | |
| 4,718,738 | 1/1988 | Bell | 383/121 |
| 4,779,998 | 10/1988 | Wischusen, III | 383/121 |
| 4,810,109 | 3/1989 | Castel | 383/121 |
| 4,848,931 | 7/1989 | Kamada et al. | 383/104 |
| 4,947,525 | 8/1990 | Van Erden . | |
| 5,059,036 | 10/1991 | Richison et al. | 383/61 |
| 5,073,035 | 12/1991 | Williams | 383/119 |
| 5,205,651 | 4/1993 | Decottignies et al. | 383/119 |
| 5,350,240 | 9/1994 | Billman et al. | 383/104 |
| 5,352,043 | 10/1994 | Takagaki et al. | 383/104 |

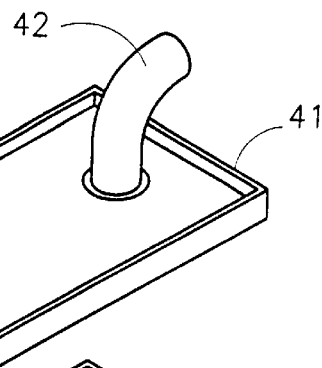
FIG.17A
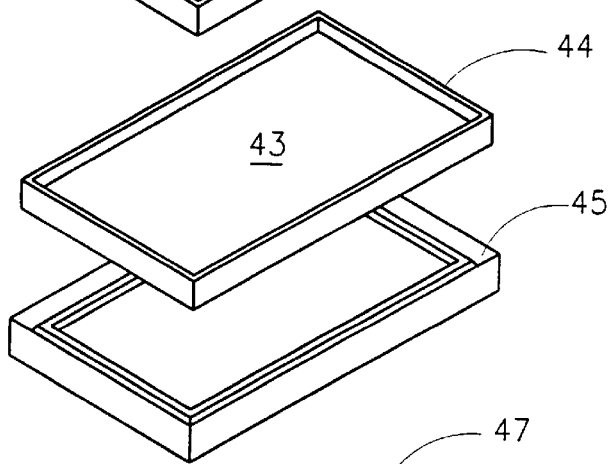
FIG.17B
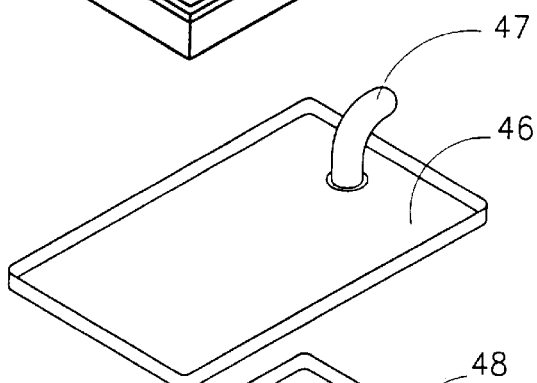
FIG.17C
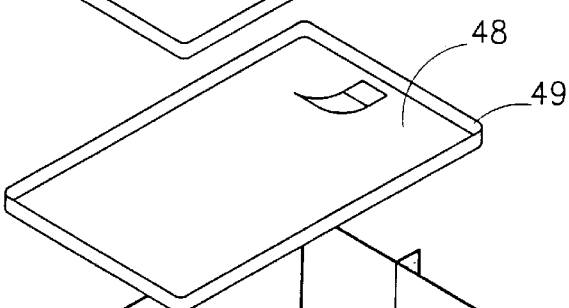
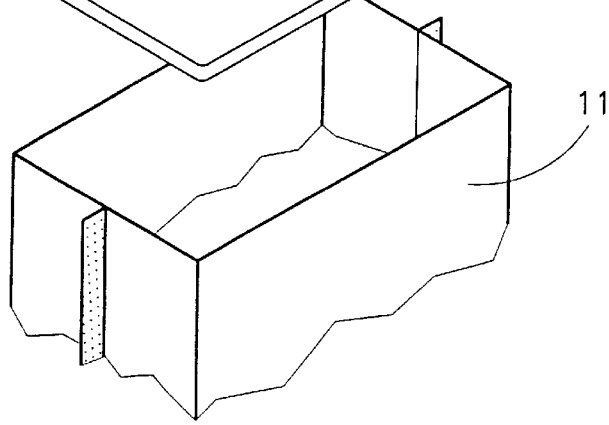
FIG.17D

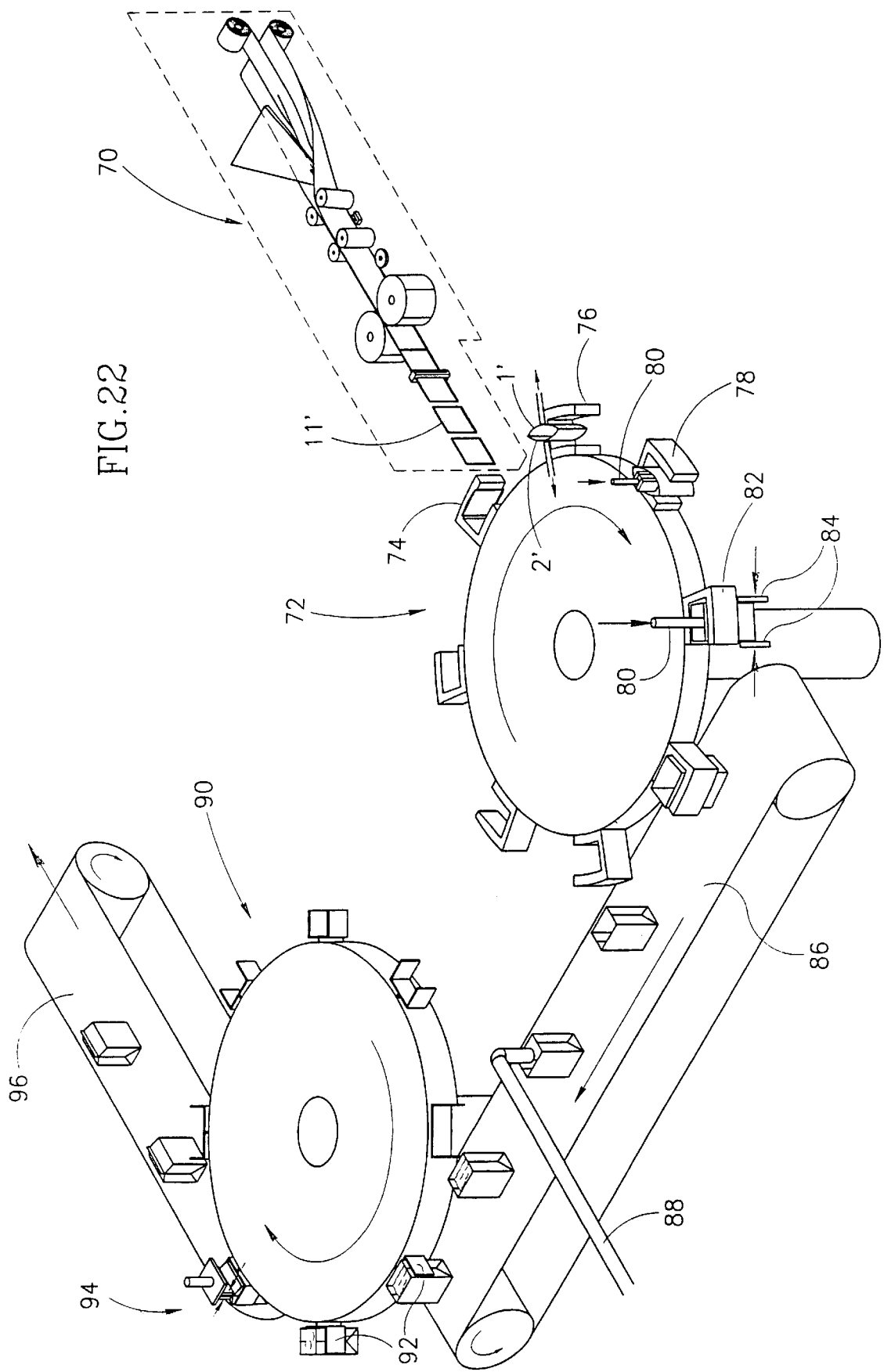

CONTAINER HAVING A RECTANGULAR BASE AND ITS MANUFACTURING

FIELD OF THE INVENTION

The present invention is related to a container having a rectangular base and it concerns also a method for manufacturing same. By using the term "container" it is referred to a container manufactured of sheets or films of flexible material formed into a suitable shape useful for containing unitary items, powdered or granulated material or liquids.

BACKGROUND OF THE INVENTION

Containers with which the present invention is concerned are a practical and cheap way for packing goods and are thus very common in the food industry although not restricted to that field. The major advantages of containers are that they are easy to manufacture, cheap and are usually suitable for holding a variety of products. Such containers require minimal space in storage and are easily disposed of.

The most used form of container is the so-called "pouch" which is a sheet of material, e.g. paper, cardboard, plastic or a laminate formed into the shape of a bag or sack.

In some cases pouches are integrally formed with a base. However, such pouches are not self-standing and they require the internal pressure of their contents for stability. Furthermore, such pouches are usually oval and are thus less stable and also require more storage space. Still another drawback is that the structure of such products is not firm and thus they may collapse when they are not completely full.

In the present description and claims, the terms "heat weldable material" or "heat weldable surface" are used for determining layers of plastic material, e.g. polyethylene, polypropylene, etc. which, upon heating melt and may then be adhered to other such layers by a process which hereinafter in the specification will be referred to as "welding". The term "heat weldable" is also referred to in the art as "heat sealable".

Typical containers are made of a single sheet folded into a container's shape with overlapping portions which are then glued or welded to one another. Such containers are usually not suitable for containing liquids and do not have a rigid structure whereby they collapse when their contents are partially withdrawn. Furthermore, containers manufactured according to the heretofore known methods are usually restricted to pouch or prismatic box-like containers.

It is an object of the present invention to provide a novel and improved container and a process for manufacturing, same in which the above-referred to disadvantages are substantially reduced or overcome.

SUMMARY OF THE INVENTION

According to the present invention there is provided a container made essentially of one or more film sheets, the container having a bottom base and walls extending upwardly therefrom; the base being essentially rectangular and defining front, rear and two side sections of the walls; the base being made of a film with both of its faces being heat weldable and the walls being made of a film having at least an inner heat weldable face; the container being constructed from a pouch having a front, rear and bottom sheet; the bottom sheet of the pouch being folded along a midline thereof with flaps extending downwards from the fold line and each of the two bottom edges of the flaps being welded to or integral with one bottom edge of either the front or the rear sheet, lateral edges of the front and rear sheet being welded to one another with the two bottom portions of the welded edges sandwiching both lateral edges of the bottom folded sheet; for construction of the container, a central portion of the bottom sheet is unfolded such that the unfolded portion has an essentially rectangular shape thus forming said base, with central parts of the bottom edges of the bottom sheet forming the front and rear edges of the base and with peripheral portions of the bottom sheet forming two overlapping triangular portions with the bottom edges thereof defining the two side edges of the rectangular base, thereby forming the container's front and rear wall sections extending from said front and rear edges and side walls extending from said side edges with the welded edges of the two sheets being at about the midline of the side walls; the structure being fixed by welding the two overlapping triangular portions to one another or by welding a peripheral triangular portion of the two overlapping ones to a juxtaposed inner face of the side sheets.

According to one embodiment of the present invention the bottom base and the walls are produced of an integral film sheet having both faces thereof heat weldable.

In order to impart the container according to the present invention rigidity, one or more reinforcement elements made of or coated with a heat weldable material is welded to the bottom face of the rectangular base and welded thereto. The reinforcement element may be constructed of several segments or may be a uniform frame, welded to the inner face of the walls adjacent their top or bottom edges.

A reinforcement element welded to the top may have a shape and size corresponding to that of the rectangular base whereby a rectangular box-like container is obtained. Alternatively, the reinforcement element may be of any other shape or size. If the reinforcement element is a rectangle larger than the base then a truncated square pyramid is acquired, suitable for stacking such containers within one another.

According to still another embodiment of the present invention, stiff elongate ribs made of or coated with a heat weldable material are welded along the internal walls of the container so as to impart rigidity thereto. Alternatively, the stiff ribs are formed integrally with one or more reinforcing elements. Said stiff ribs may have different shapes so that when they are welded to the walls the container obtains a shape corresponding to that of said ribs.

The present invention further provides a process for the manufacture of a container, the container having an essentially rectangular base with walls, consisting of a front, rear and two side sections extending upwardly therefrom, the base being made of a film with both of its faces being heat weldable and the walls being made of a film having at least an inner heat weldable face; the process comprises:

(a) preparing a pouch having a front, rear and bottom sheet, the bottom sheet being folded along a midline thereof with the flaps extending downwards from the fold line and the two bottom edges of the flaps being each welded to or integral with a bottom edge of either the front or the rear sheet, lateral edges of the front and rear sheet being welded to one another with their bottom portions sandwiching both lateral edges of the bottom sheet;

(b) unfolding a central portion of the bottom sheet such that the unfolded portion assumes a rectangular shape and the two peripheral portions form two overlapping triangular portions;

(c) welding the two overlapping triangular portions to one another or welding a peripheral triangular portion of the two with juxtaposed inner face of a juxtaposed sheet.

Another aspect of the present invention concerns continuous processes for preparing pouches useful in continuous manufacture of containers according to the invention.

BRIEF DESCRIPTION OF THE DRAWINGS

For better understanding, the invention will now be described by way of example only, with reference to the accompanying drawings, in which:

FIGS. 17(a)–(d) are isometric exploded views of different means for sealing or closing the top of the container;

FIG. 22 is a perspective view depicting a continuous manufacturer process of a container in accordance with an embodiment of the present invention;

DETAILED DESCRIPTION OF SPECIFIC EMBODIMENTS

Figure 1:
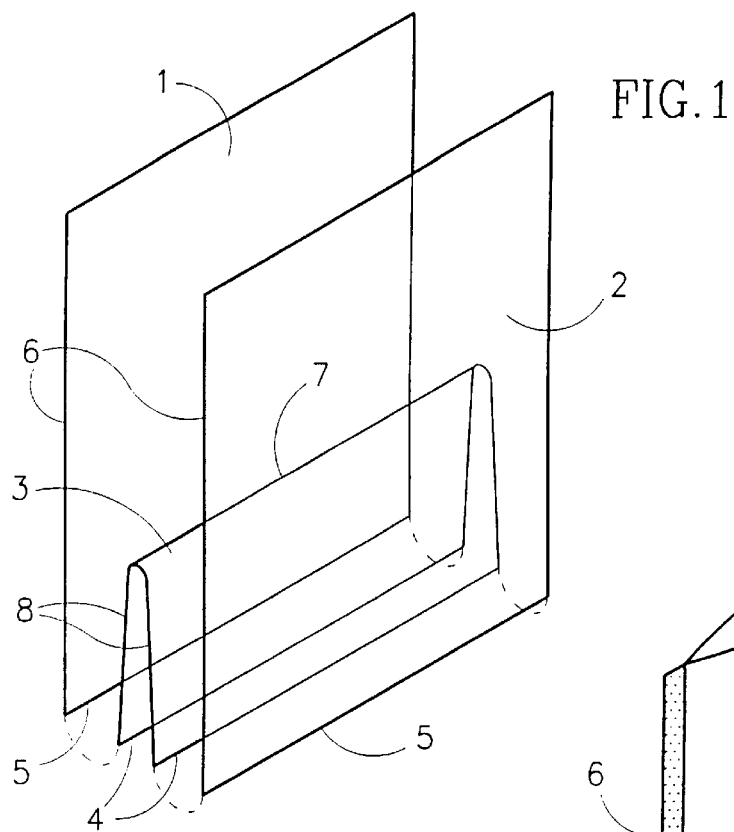
FIG. 1 is an exploded isometric view of the constituents of a basic container according to the present invention positioned according to a first step of its manufacture.
Figure 2:
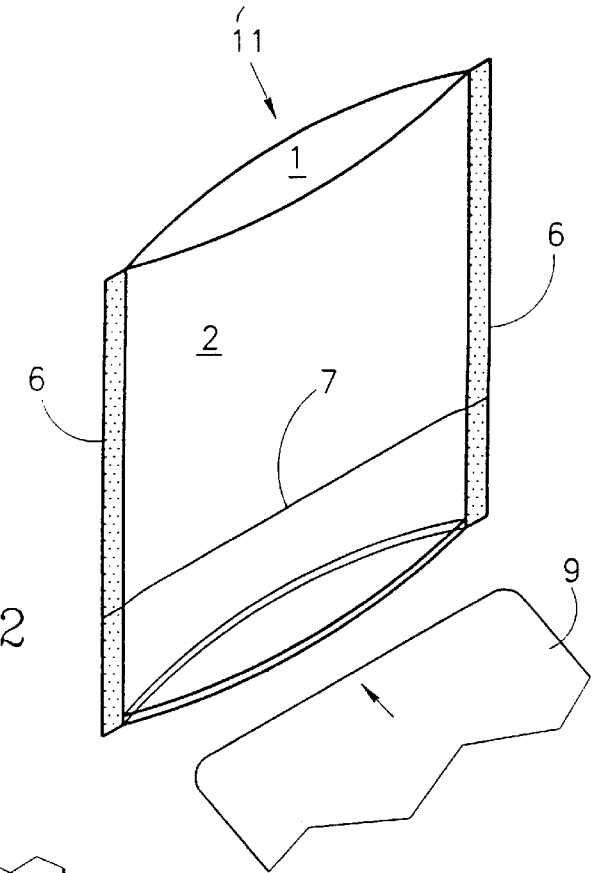
FIG. 2 is an isometric view of a pouch manufactured according to the present invention.

Reference is first made to FIGS. 1 and 2 of the drawings in which two sheets 1 and 2 of substantially the same size are positioned facing each other where the facing surfaces of the sheets are made of or coated with a heat weldable material such as polyethylene.

A third sheet 3 has the same width as that of sheets 1 and 2 and is made of or coated on both faces with a heat weldable material. The third sheet 3 is folded into two and is then placed between the two sheets with its bottom edges 4 aligned with the bottom edges 5 of sheets 1 and 2 and the fold line 7 between the sheets 1 and 2.

Alternatively, a single sheet of material made of or coated on both faces thereof with a heat sealable material is used instead of said three single sheets 1, 2 and 3 as can readily be understood and illustrated in FIG. 1 by the dashed lines.

Then the lateral edges 6 of the sheets 1 and 2 are welded as known per se, sandwiching the lateral edges 8 at the folded sheet 3.

At a second step the bottom edges 5 of sheets 1 and 2 are welded to respective bottom edges 4 of sheet 3. Welding of the two bottom edges 4 to one another is prevented by first inserting therebetween a plate 9 coated with a non adhering material such as Teflon™ or silicon, prior to the welding process. At the end of this process a pouch generally designated 11 is formed.

Figure 3:
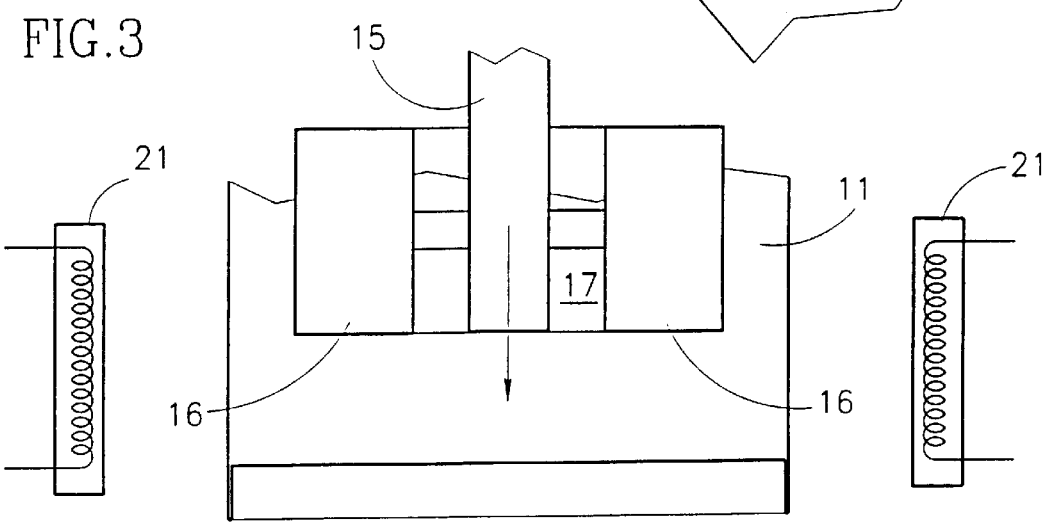
FIG. 3 illustrates how the rectangular shape of the base is obtained.
Figure 4:
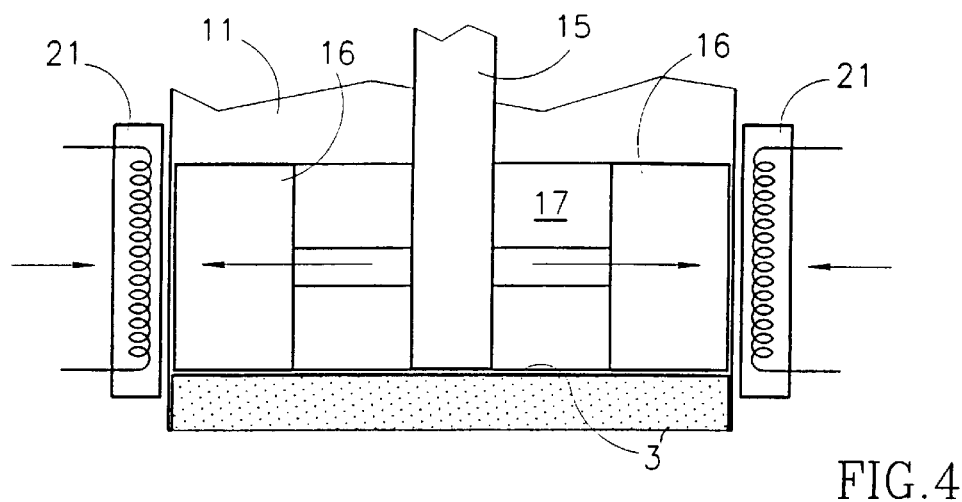
FIG. 4 is a schematic illustration of the welding process of the rectangular base.
Figure 5:
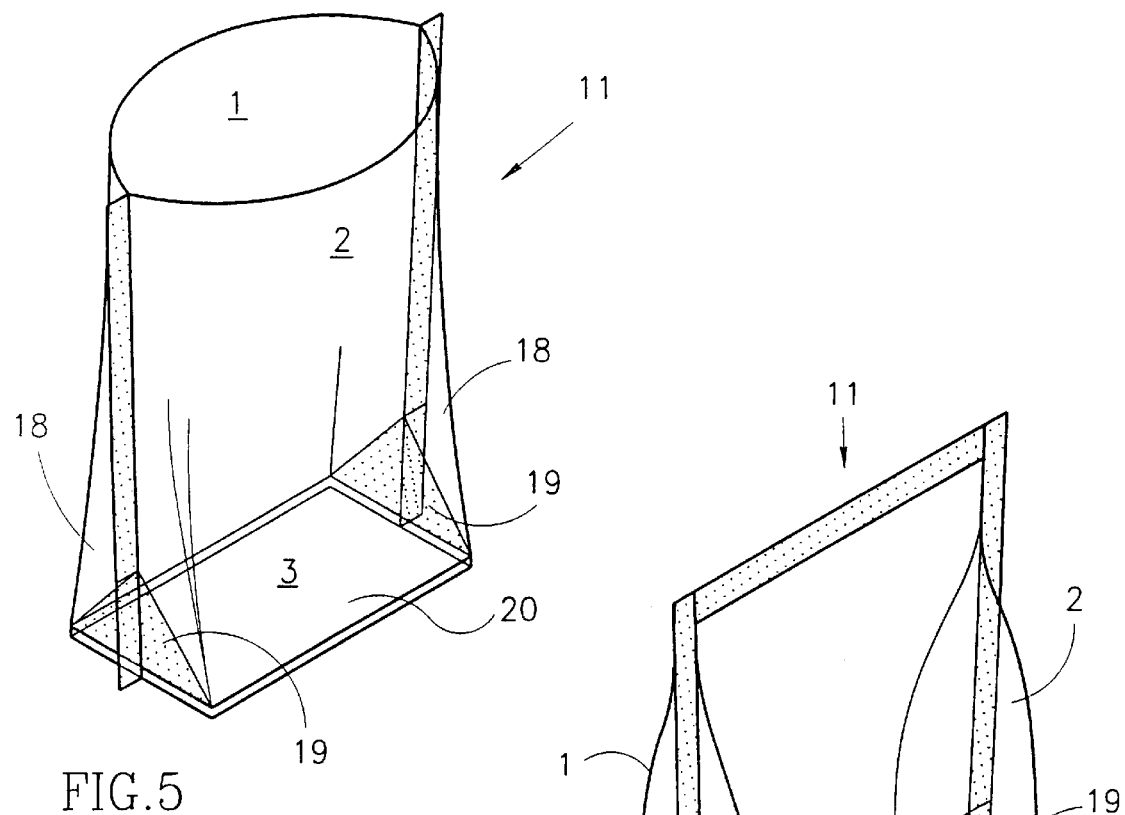
FIG. 5 is an isometric view of a basic form of a container according to the present invention.

Reference is now being made to FIGS. 3–5 illustrating how the rectangular base is formed. A rectangular core member 15 is provided with members 16 and 17 laterally expendable in two perpendicular axes and coated with a non adhering material. The core 15 is then inserted into the pouch 11 and is pushed down until a central portion of the third sheet 3 becomes substantially flat at the bottom of the pouch 11 whereby, a flat rectangular base 20 is formed.

As seen in FIG. 5, after this step is completed, side walls 18 are formed as well as two overlapping triangular portions 19 formed out of the third sheet 3 at each side of the container and which partially overlap the side walls 18. The elements 16 and 17 of the core member 15 are then expanded as seen in FIG. 4 so as to snugly fit at the bottom of the pouch, pressing the triangular portions 19 against the side walls 18.

In order to fix the rectangular shape of the base, the triangular portions 19 must be welded to the side walls 18. Heat is applied to the triangular portions by electric thermal pads 21 as known per se and if required also from thermal elements within core 15 (not shown). After the expandable members 16 and 17 are retracted, the core 15 can be removed from the pouch and a self-standing rectangular base container according to the present invention is obtained.

Figure 6:
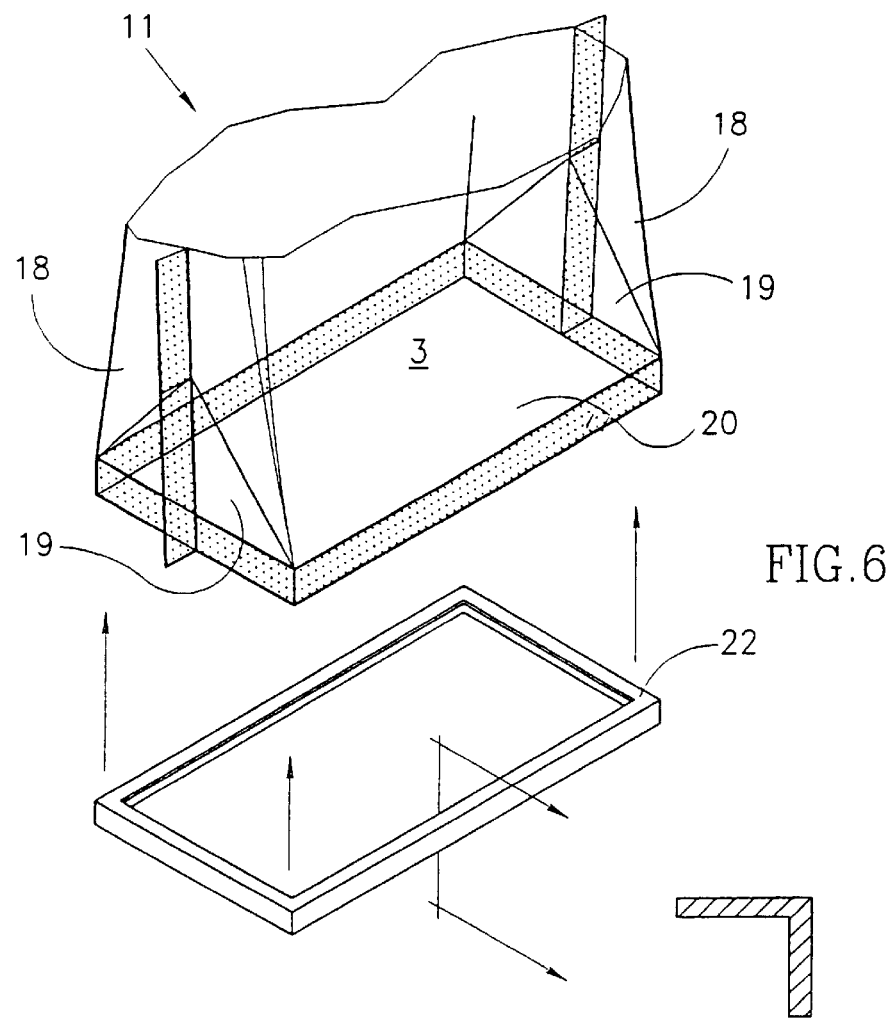
FIG. 6 is an exploded isometric view of only a bottom portion of a container according to the present invention and a reinforcement element.

In accordance with another embodiment shown in FIG. 6, a reinforcement element 22 is made of or coated with a heat sealable material and which in the particular embodiment has a rectangular frame shape fitted for welding to the bottom surface of the rectangular base 20 in a manner as will hereinafter be explained in detail. As seen, the reinforcement member has an inverted L-shaped cross-section for supporting a peripheral portion of the base. Alternatively it may be provided with strengthening ribs or may be a flat surface or even consists of four individual right angled members.

Figure 7:
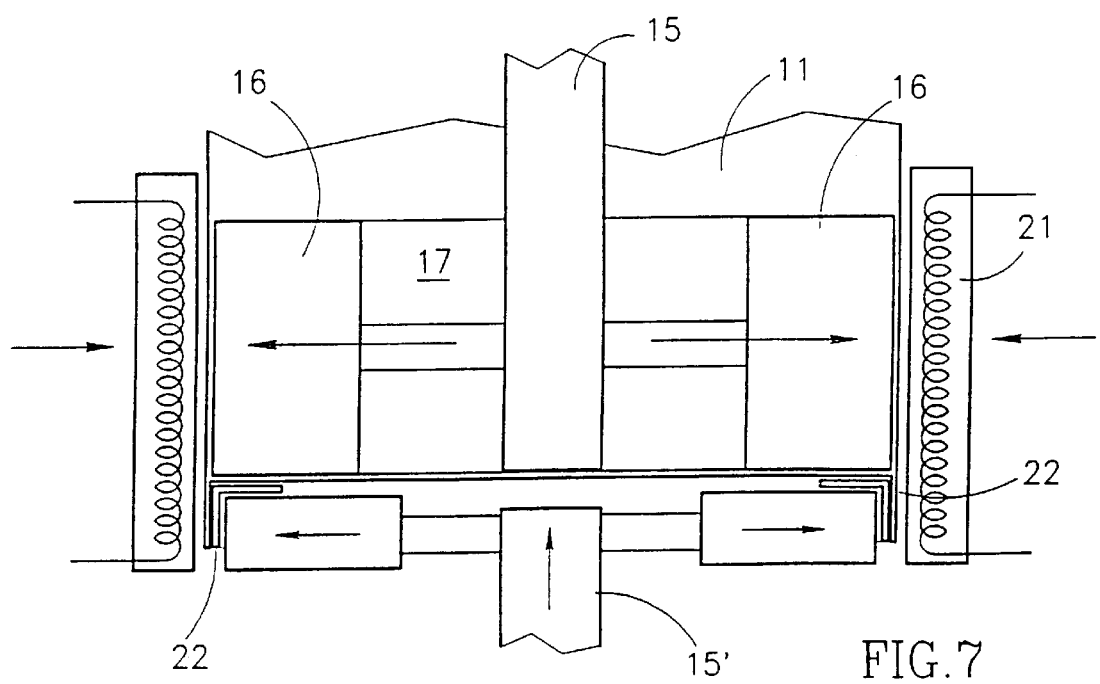
FIG. 7 is a schematic illustration of how the reinforcement frame of FIG. 6 is welded to the rectangular base of the container.

FIG. 7 schematically illustrates how the reinforcement element 22 is attached to the container's base. A first expandable rectangular core 15 as explained with reference to FIG. 4 is inserted into the container and a second similar expandable rectangular core member 15' is positioned under the reinforcement element 22. Then the cores 15 and 15' are expanded and pushed against one another whereby the reinforcement member is brought into position with respect to the container, with heat applied by electric thermal pads 21, whereby the reinforcement element is welded to the container as already explained. Heat may also be emitted by heat pads integral with the core members 15 and 15'.

Figure 8:
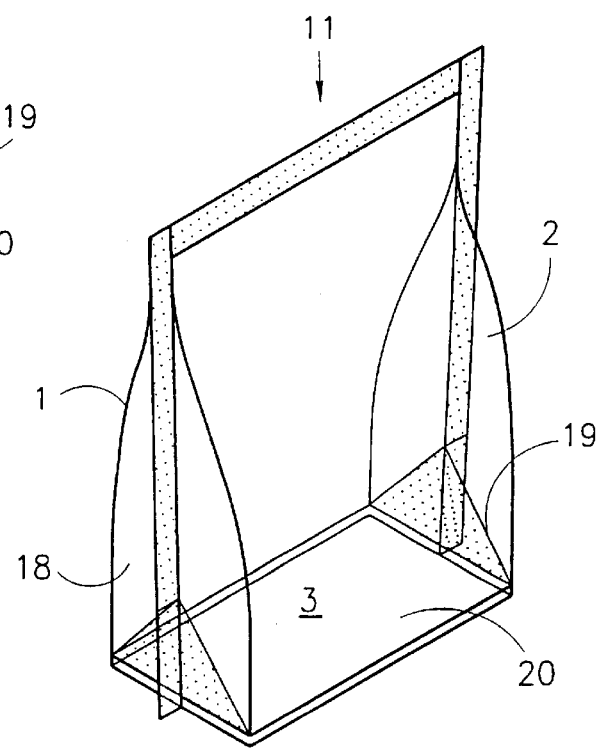
FIG. 8 is an isometric view of a container according to the present invention in which the top edges of the front and rear walls are welded so as to seal the container.

FIG. 8 illustrates one embodiment of sealing the container by welding the top edges of the front and rear walls 1 and 2. In this way the container maintains its rectangular base shape.

Figure 9:
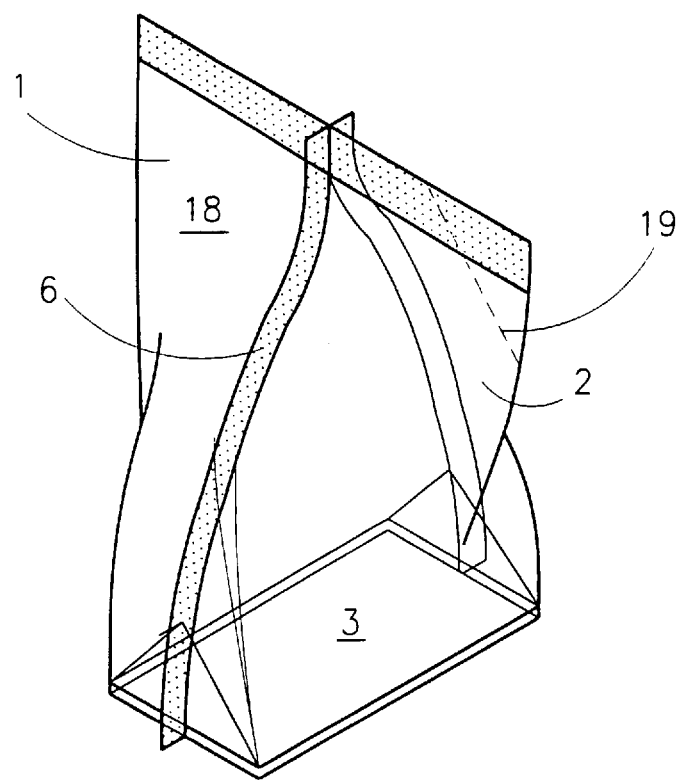
FIG. 9 is an isometric view of a container according to the present invention in which the top edges of the side walls are welded so as to seal the container.
Figure 10:
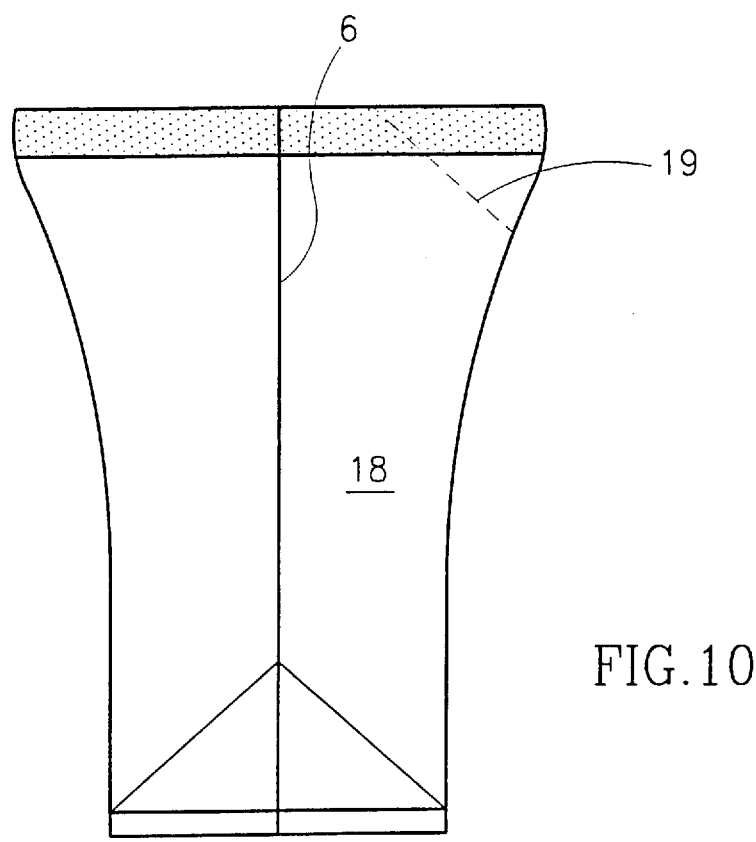
FIG. 10 is a side elevation of the container of FIG. 9.

FIGS. 9 and 10 show how the container is sealed by welding the top edges of the side walls 18 obtaining the special shape as seen. The dashed line 19 illustrates a tear-line for pouring liquid.

Figure 11:
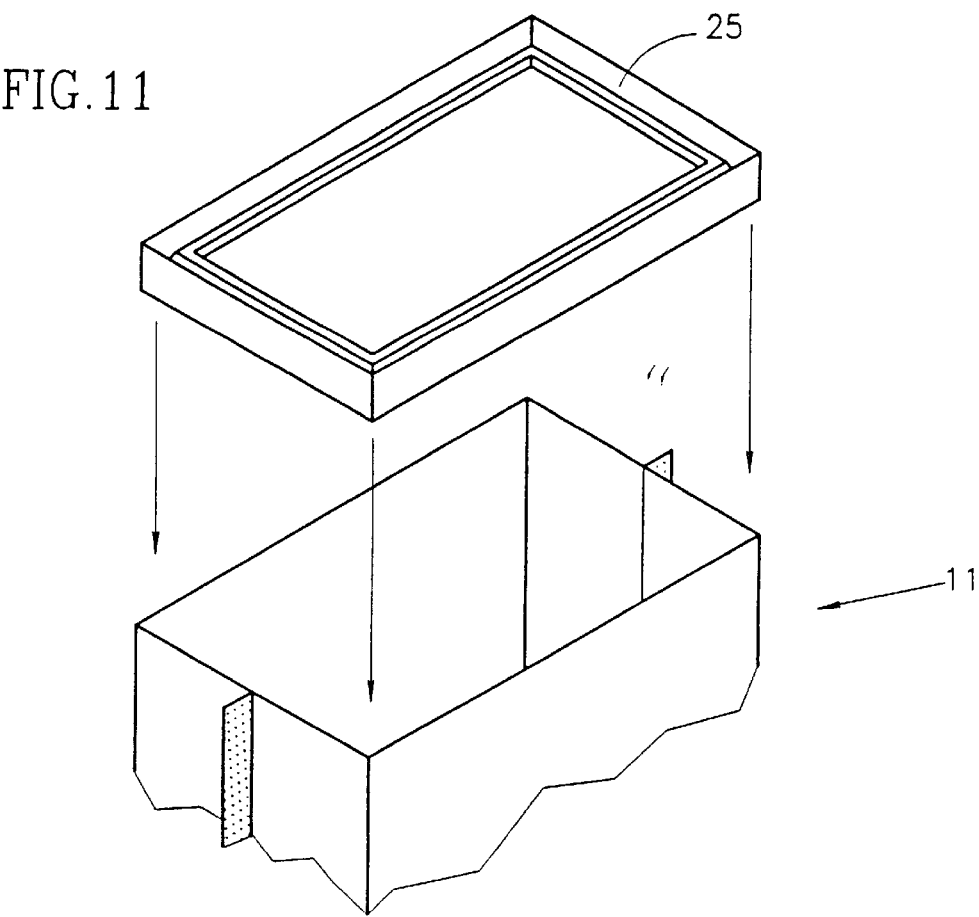
FIG. 11 is an exploded isometric view of only a top portion of a container according to the present invention and a reinforcement frame.

Referring now to FIG. 11 there is shown a top rectangular portion of a container 11 and a rectangular reinforcement frame element 25. The reinforcement frame 25 is made of or coated with a heat weldable material and when assembled it snugly fits within the container flush with the top edges and is then welded thereto, whereby the top edge of the container acquires the shape of the reinforcing element and becomes firm and will not deform.

However, it should be obvious that any size and shape of reinforcement element 25 may be used as long as it can be securely welded to the top edges of the container. It should also be obvious that the reinforcement element made be made of or coated with a heat sealable material as previously explained, or it may be made of metal or other suitable material which may be secured to the container by folding it over the top edges of the container and clampingly attaching it or by other means as known per se.

Figure 12:
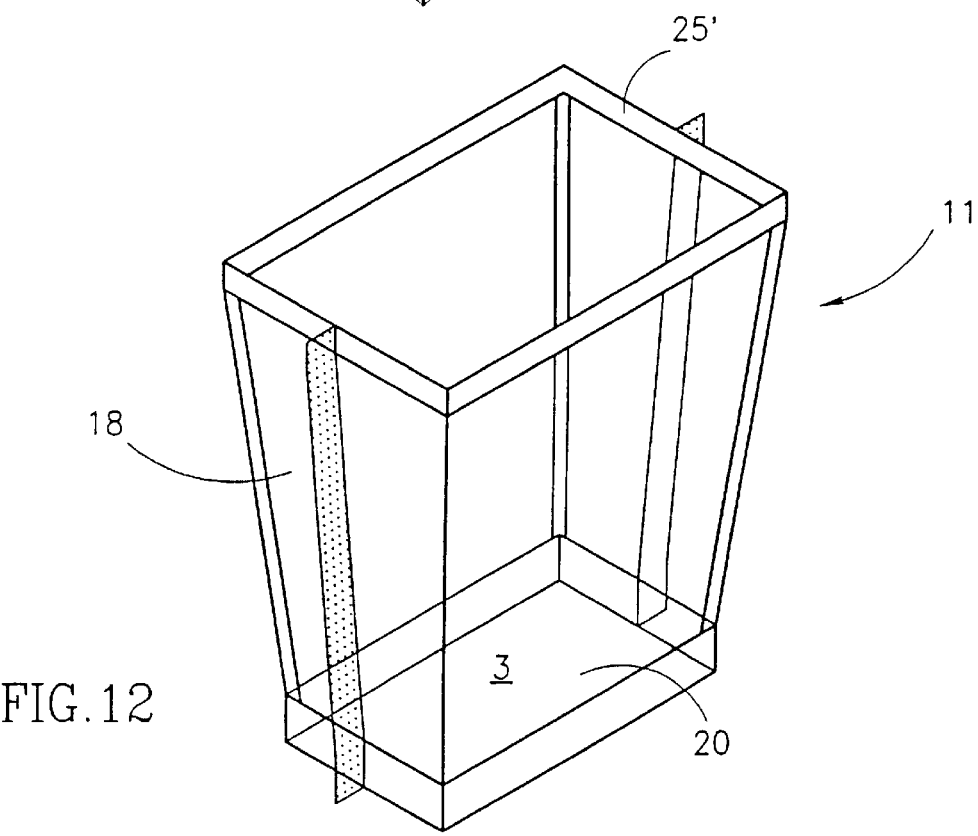
FIG. 12 is an isometric view of a container according to the present invention having a shape of an inverted truncated rectangular pyramid.

In FIG. 12 a container 11 is formed as already explained with the sheets 1 and 2 made of a material which may be stretched under heat such as polyamide and which sheets are coated or laminated with a heat weldable material. Then, an expandable core having a cross-section of a rectangular pyramid (not shown) is fully inserted into the container and is expanded until its side plates are pressed against the inner walls of the container. Then the expanded core is heated by internal thermal elements (not shown) to a temperature suitable for plastic deformation of the laminate constituting the walls of the container. It is then slowly drawn out of the container while gradually expanding the cross-section of the core, resulting in that the container acquires a shape of an inverted truncated rectangular pyramid as seen in FIG. 12.

Alternatively the rectangular pyramid-shape may be formed in a hot environment instead of applying direct heat to the container, for example, in an oven or in a hot air tunnel or in a combination thereof.

Then a rectangular reinforcement frame element 25' having a larger projection than the rectangular base 20 is welded to the top edge of the container as seen in FIG. 12, imparting the container's rigidity.

The container seen in FIG. 12 is suitable for stacking within similar such containers, thereby reducing storage space required for such empty containers.

Figure 13:
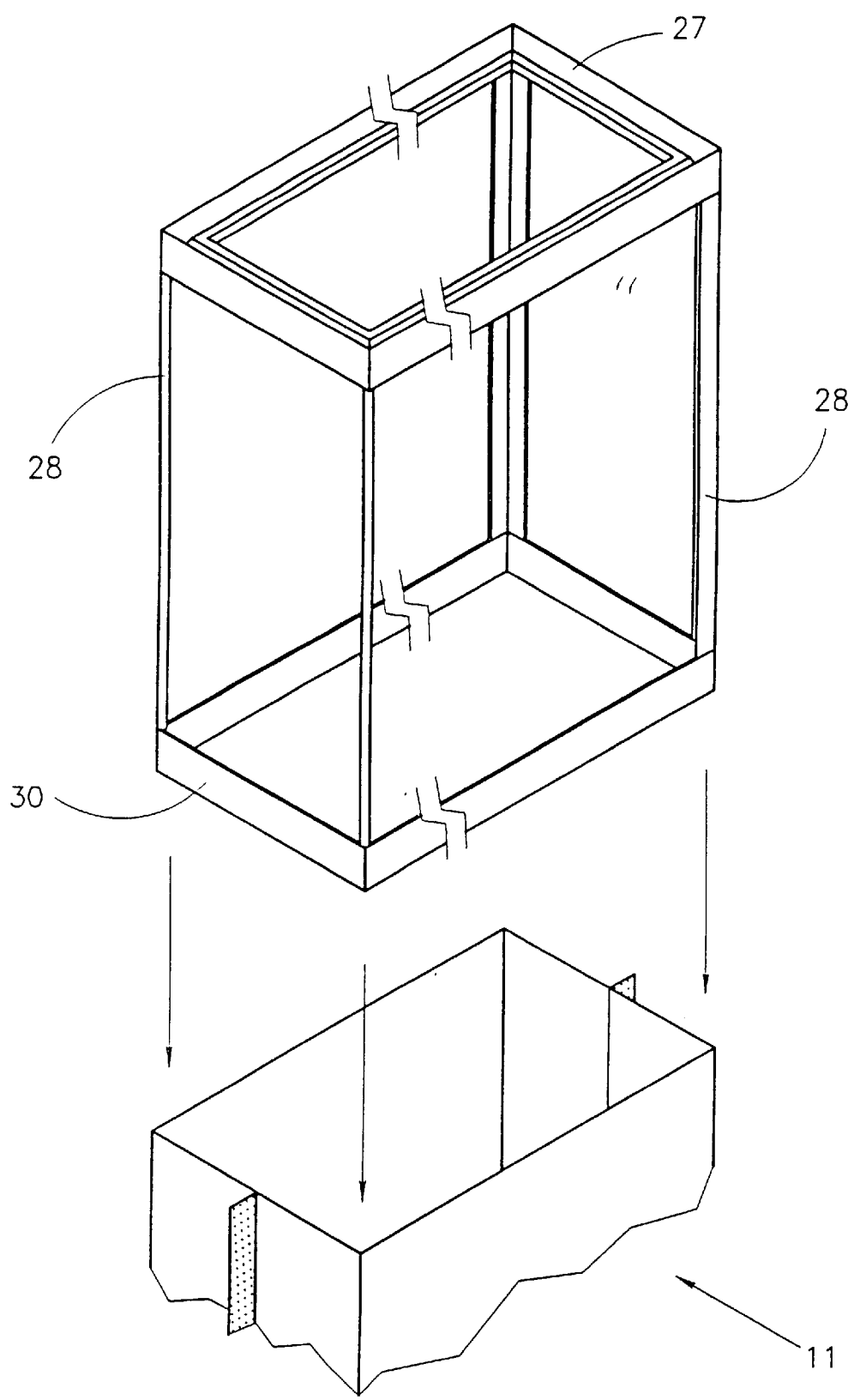
FIG. 13 is an exploded isometric view of only a top portion of a container according to the present invention with a rectangular reinforcement frame provided with integral elongate studs projecting downwards.

FIG. 13 illustrates how a reinforcement element 27, made of or coated with a heat sealable material, is integral with four reinforcement studs 28 projecting downwards from the corners of the frame. The studs 28 are also made of or coated with a heat sealable material and are substantially as long as the inner length of the container. The frame 27 with the integral studs 28 is inserted into the container 11 and is welded to the container by applying heat and pressure thereto by means of an expandable core (not shown), as already explained.

In accordance with another embodiment of the present invention, also seen in FIG. 13, a second reinforcement frame 30 is integral at an opposed end of the studs 28 parallelly disposed with respect to the top reinforcement frame 27, whereby improved rigidity is obtained.

Once the studs 28 are welded to the container, the latter becomes reinforced in its axial direction too, retaining its rectangular box-like shape even if it is crashed while empty.

Figure 14:
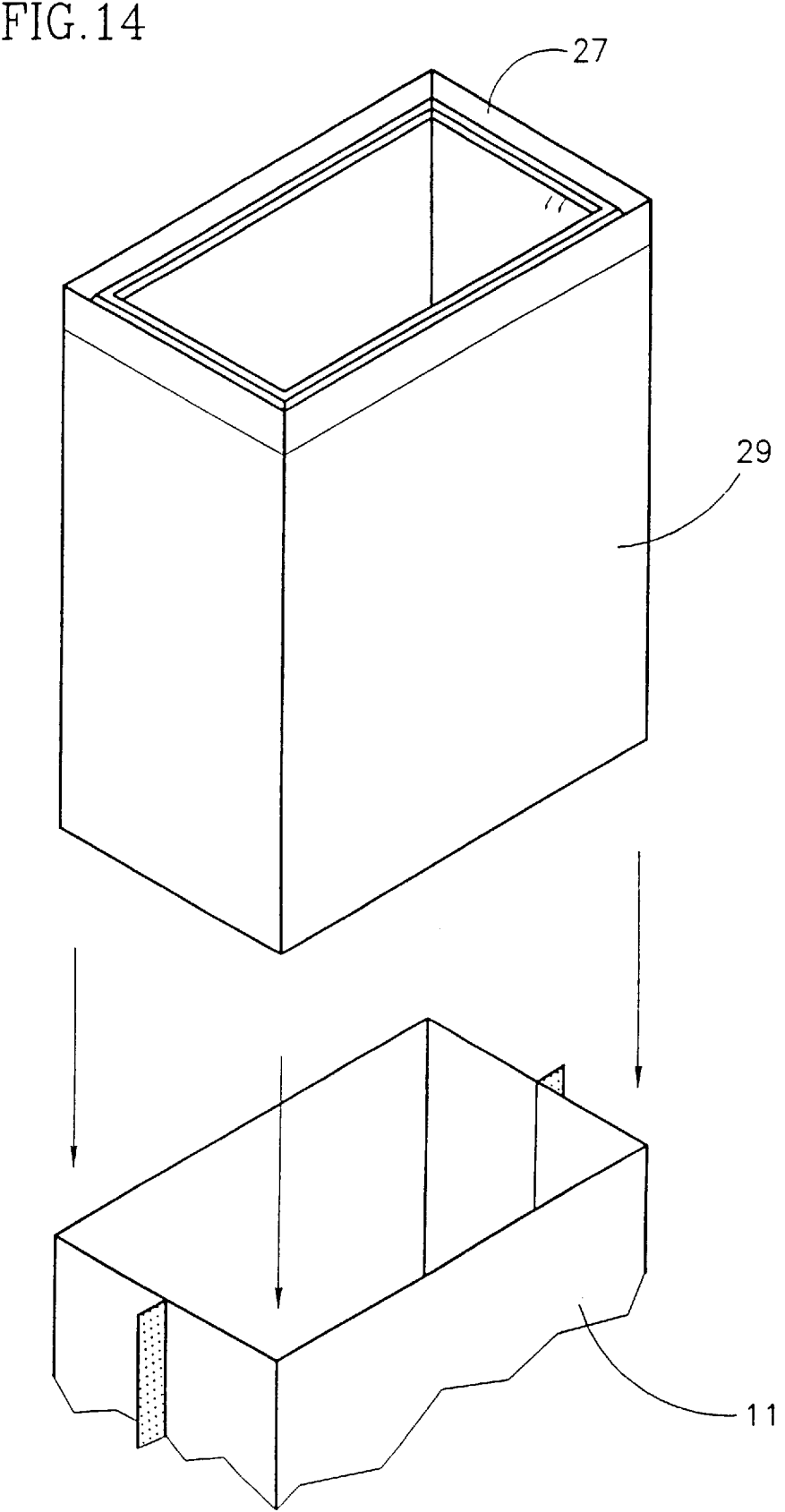
FIG. 14 is an exploded isometric view of only a top portion of a container according to the present invention with a rectangular reinforcement frame provided with a box-like support structure.

FIG. 14 differs from FIG. 13 in that instead of the four studs 28 the reinforcement element 27 is integral with a reinforcement box-like structure made of or coated with a heat sealable material and suitable for inserting into the container 11 abutting with the walls of the container. Preferably the reinforcement box-like structure 29 is welded to the walls of the container but this is not compulsory.

Figure 15:
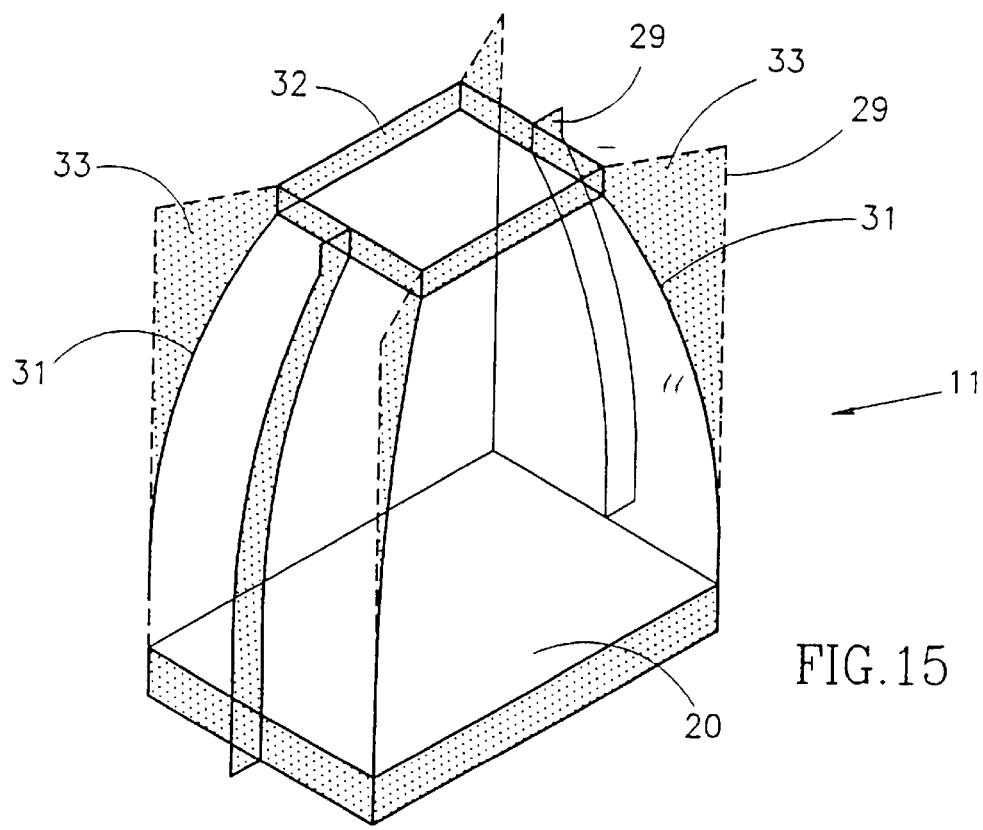
FIG. 15 is an isometric view of a container according to the present invention in which the top base is smaller than the rectangular base.

FIG. 15 of the drawings illustrates a container with narrowing walls. After forming the container 11 as already explained, the straight edges 29 (illustrated by dashed lines) are reformed along a concave line 31 which may as well be straight or other lines. The edges are welded along lines 31 by means of hot pressure plates (not shown) obtaining the narrowing shape of the container. Then reinforcement frame 32 is welded at the top of the container as previously explained and the excessive welded flaps 33 may be cut adjacent the welding line 31 for pleasing the eye.

Figure 16:
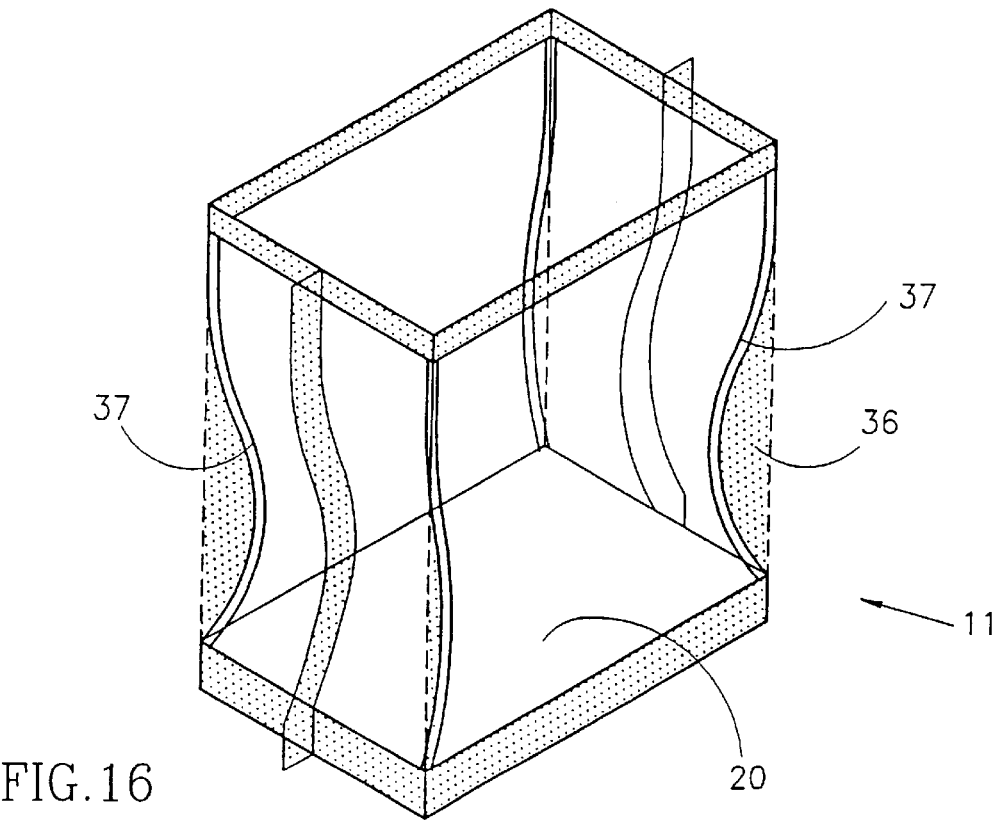
FIG. 16 is an isometric view of a container according to the present invention formed with a narrowing middle portion.

FIG. 16 shows a container with a narrowing portion 36 along the container, whereby new corner edge 37 is produced by pinching and welding together respective portions of the side walls with the adjacent front and rear walls, similar to the embodiment of FIG. 15 and if required removing the excessive portions 36.

FIG. 17 illustrates several means for sealing or closing the top of the container. In FIG. 17(*a*) a frame 41 made of or coated with a heat sealable material is provided with a nozzle 42 which frame 41 is welded or attached to frame 25 as previously discussed. The contents of the container is consumed through nozzle 42 which may be closed by a suitable seal. In FIG. 17(*b*) there is an aluminum foil 43 embedded within a frame 44 made of or coated with a heat sealable material which snugly fits within frame 45. The frame 44 is welded to frame 45, whereby the container is sealed. When it is desired to consume the contents of the container, then the aluminum foil 43 is cut adjacent frame 44 and removed whereby a suitable plastic cover may be provided for repeatable sealing and closing of the container.

In FIG. 17(c) the container is sealed by cover 46 provided with a nozzle 47, whereby the cover 46 is directly welded or otherwise attached to the container 11 omitting the use of a reinforcement frame 45.

In FIG. 17(d) a foil 48 made of aluminum or any other material suitable for sealing and having an integral frame 49 is directly welded to the top edges of container 11, omitting the use of frame 45 as in FIG. 17(c). It should be obvious that the cover may be attached to the container by any other suitable means as known per se.

Figure 18:
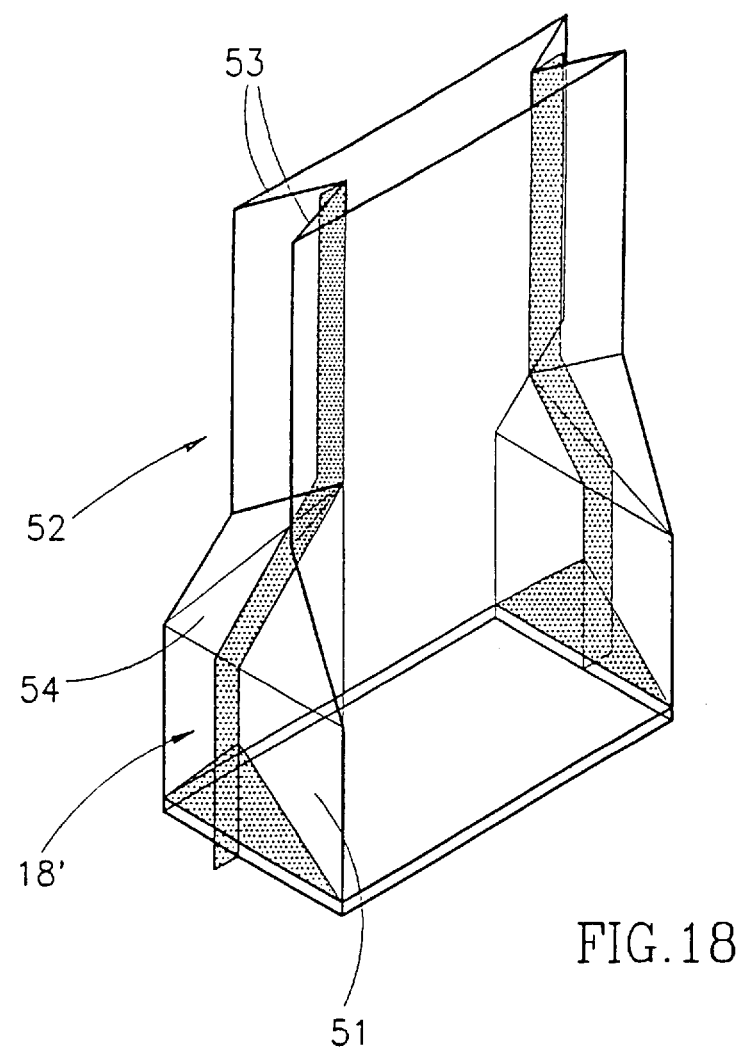
FIG. 18 is an isometric view of another embodiment of a container according to the present invention.

In FIG. 18 another embodiment of a container is seen in which the side walls 18' consist of a substantially flat portion 51 and a gusset portion 52 consisting of two overlapping flaps 53 and an intermediate portion 54.

Figure 19:
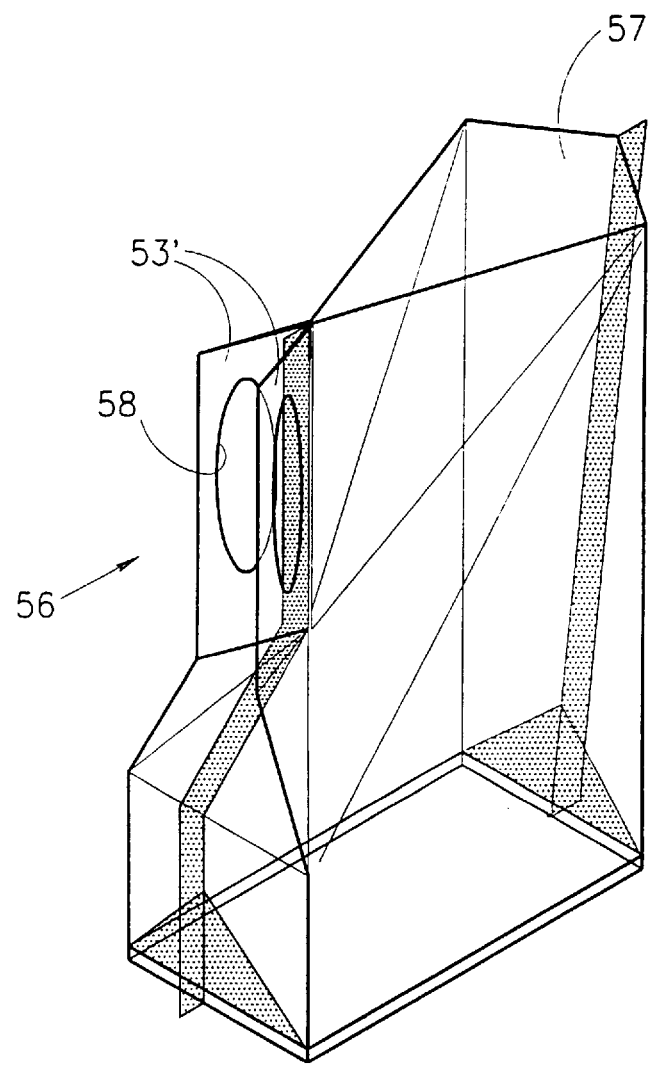
FIG. 19 is an isometric view illustrating a modification of a container according to the present invention.

FIG. 19 shows how the container is manufactured in the shape of a jug formed with a handle portion 56 and a pouring mouth 57. The handle portion is made by forming a gusset portion as in the embodiment of FIG. 18 and welding the overlapping flaps 53' to one another. Thereafter, an opening 58 is cut out in each of the flaps 53', said openings serving for gripping the container.

Figure 20:
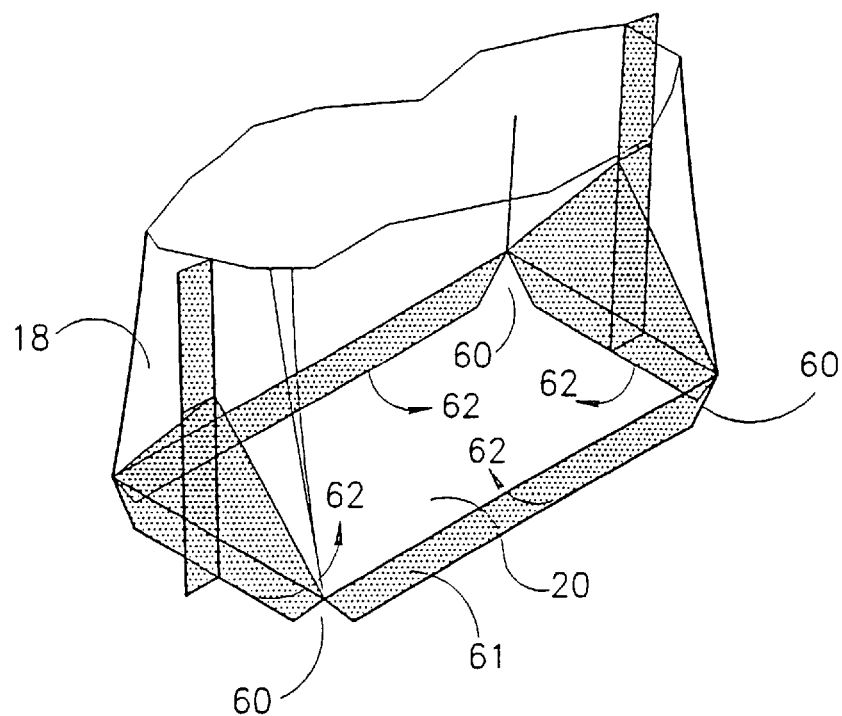
FIG. 20 is an isometric partial view of a step in obtaining a base according to a modification of the invention.
Figure 21:
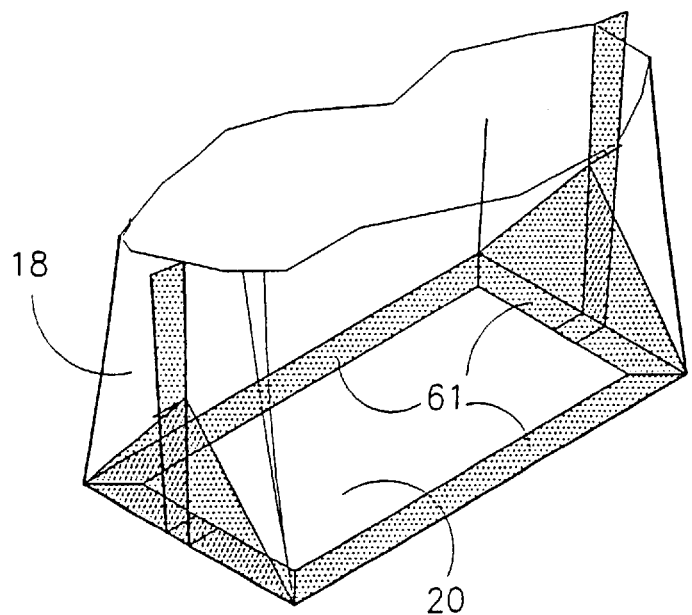
FIG. 21 is an isometric partial view of the modification as in FIG. 20.

FIGS. 20 and 21 illustrate the steps of reinforcing the base portion of the container according to another embodiment of the invention. After the container is complete as seen in FIG. 5, instead of attaching a reinforcement member 22 (as in FIG. 6), a slot 60 is cut at each corner of the base skirt 61. Then, the portions of the skirt are folded inward as indicated by arrows 62 and are welded to the bottom face of the base member 20, whereby the base becomes stiff and durable.

Attention is now directed to FIGS. 22 to 26 schematically depicting the stages of a process for manufacturing a container according to the present invention, comprising also filling and sealing mains.

Various manufacturing stages and components of the container are the same as those of FIGS. 1 to 5 and accordingly, like elements and components are given the same reference numerals as the corresponding ones in FIGS. 1 to 5 with a prime indication, and the reader is referred to those previous figures for a detailed explanation.

FIG. 22 depicts a schematic layout of a continuous process for preparing, filling and sealing a container according to the present invention.

A first step generally designated 70 is preparing a pouch 11'. Several detailed examples of this step will be specified hereinafter.

The prepared pouch 11' then approaches a rotating work site generally designated 72 and comprising gripping means 74 which may be, for example, vacuum pads as known per se. Then, at 76 the pouch 11' is expanded by suction means separating the sheets 1' and 2' from one another.

The next step indicated 78 comprises inserting an expandable core 80 into the pouch and at station 82 a central portion of the bottom sheet of the pouch is unfolded so that the unfolded portion assumes its rectangular shape and the two peripheral portions form two overlapping triangular portions as explained. Finally, two welding pads 84 laterally approach the container and weld the two overlapping triangulares in order to fix the container's shape, as hereinbefore explained.

Further, working stations may be added to the assembly 72, e.g. for adding reinforcement elements, special configuration of the container, etc. as already explained hereinabove. The work site 72 then discharges the container over a conveyer belt 86, advancing the ready container to a filling station 88 for automatically filling as known per se.

Then, the filled containers progress over the conveyor belt towards a sealing site generally designated 90, wherein the containers are gripped by suitable arms 92 and introduced into a sealing station 94, wherein the containers are sealed, e.g. by welding the top edges as illustrated in FIG. 8 or by any other suitable sealing means as described with reference to FIGS. 9, 10 or 17 or otherwise.

At the end of this step, the containers are ready for consuming and are conveyed by conveyor 96 to a packing station (not shown).

Referring now to FIGS. 23(a) to (g), there is seen the first step of the process, generally designated 70 in which a pouch 11' is prepared.

A first film 100, having a top surface 102 coated with a heat weldable material, released from an unwinding roller 104. Simultaneously, a second film 106, having both faces thereof coated with a heat weldable material, is dispensed from an unwinding roller 108, centrally positioned over the first film 100 (as seen in FIG. 23(c)).

Figures 23A, 23B:
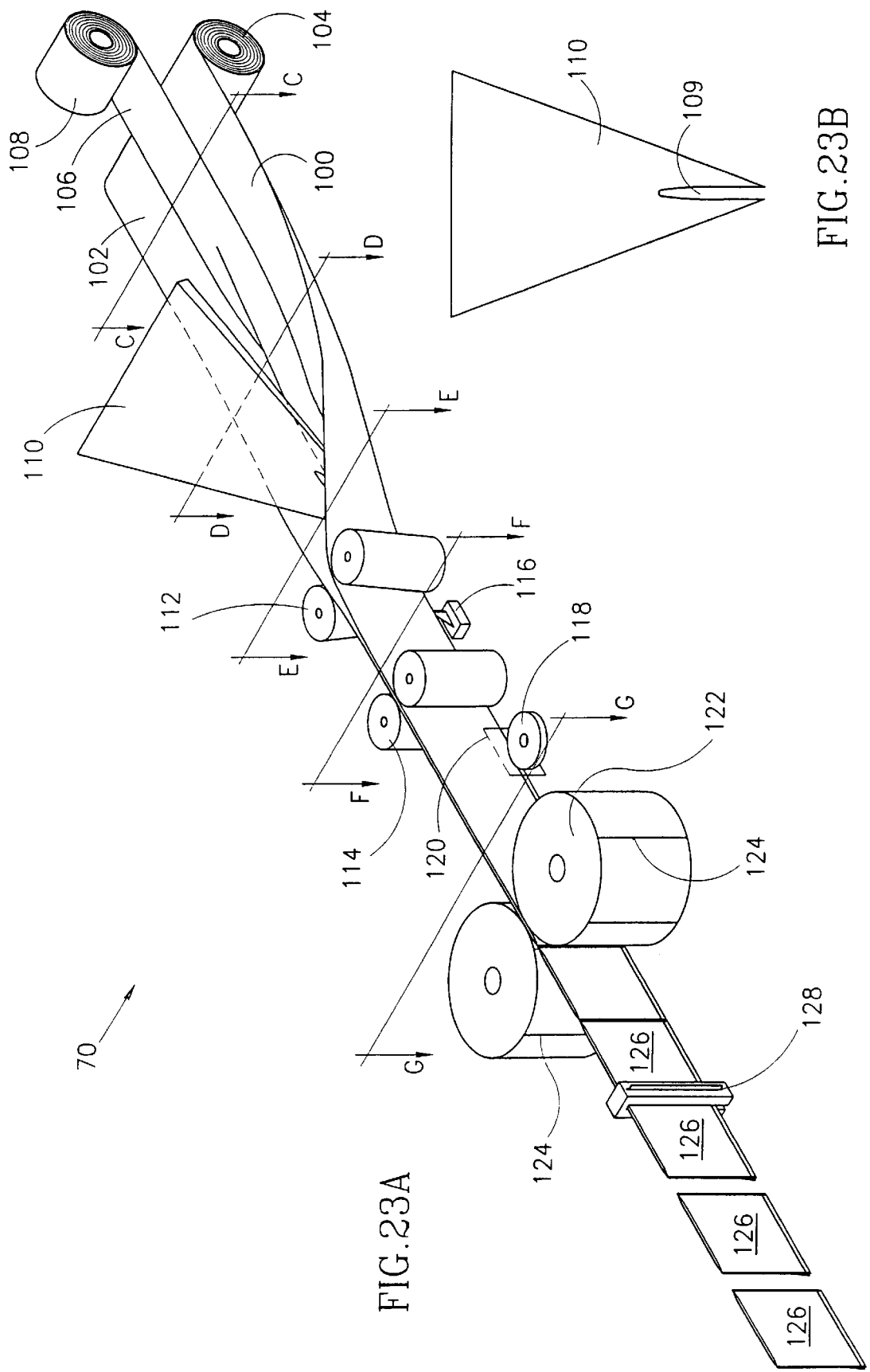
FIG. 23(a) is a perspective view depicting one process for preparing a pouch for the manufacture of a container according to the present invention.
FIGS. 23(b)–(g) are schematic cross-sections through different stages of the process of FIG. 23(a)
Figure 23C:
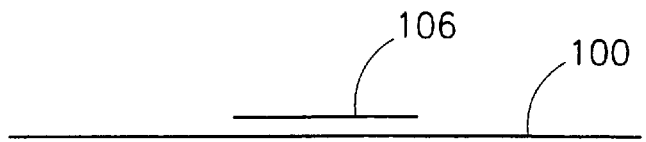
Figure 23D:
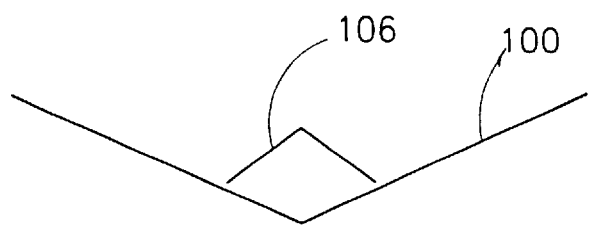
Figure 23E:
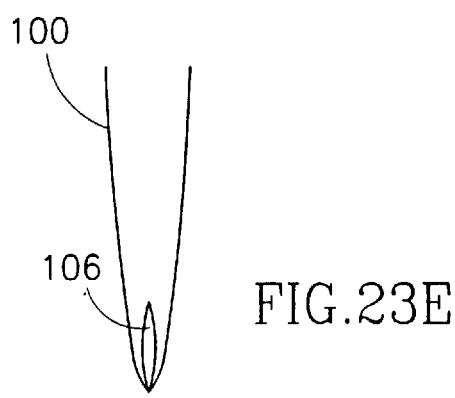
Figure 23F:
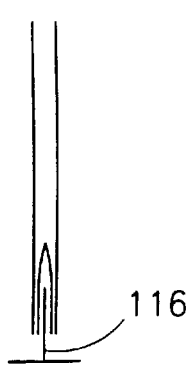
Figure 23G:
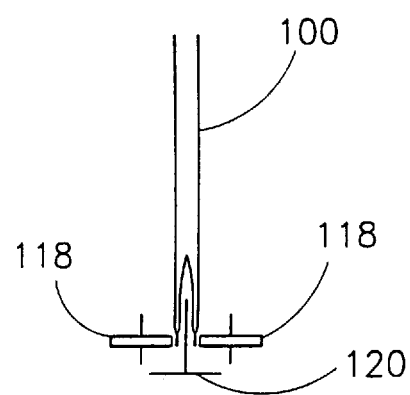
Figure 24A:
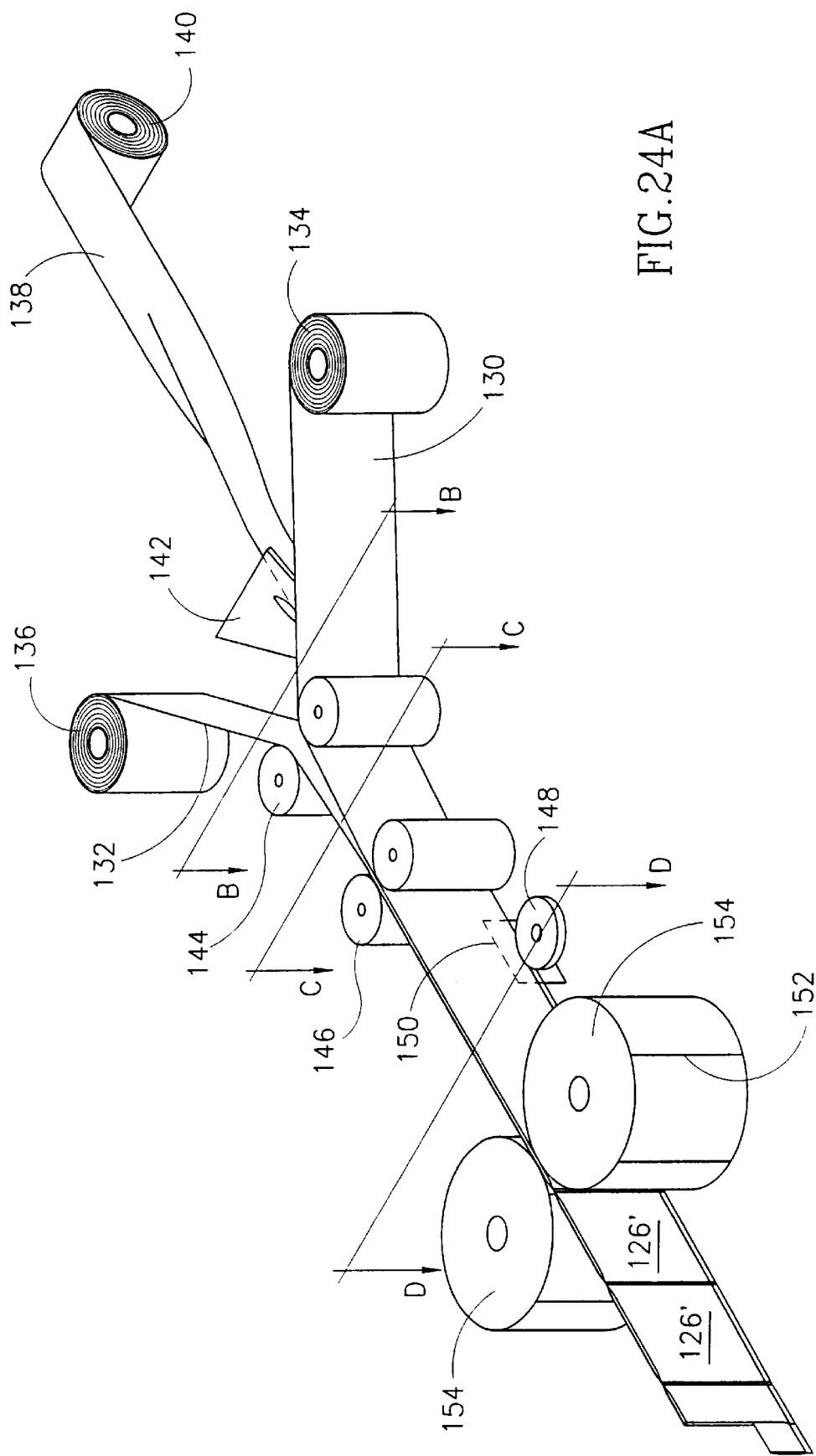
FIG. 24(a) is a second process for preparing a pouch for the manufacture of a container according to the present invention.
Figure 25A:
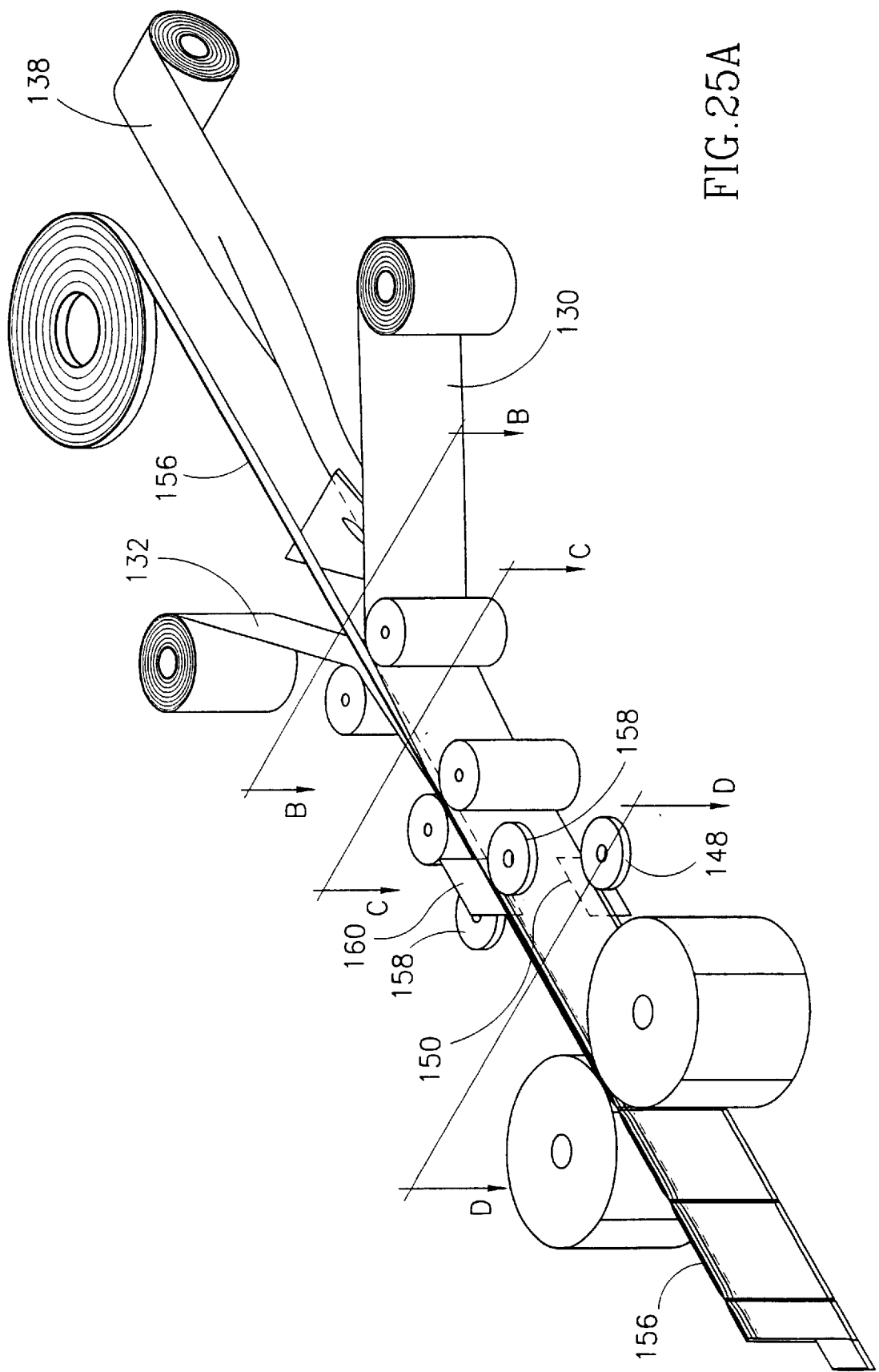
FIG. 25(a) is a perspective view depicting the manufacture of a pouch according to a third process for the manufacture of a container according to the present invention.
Figure 24B:
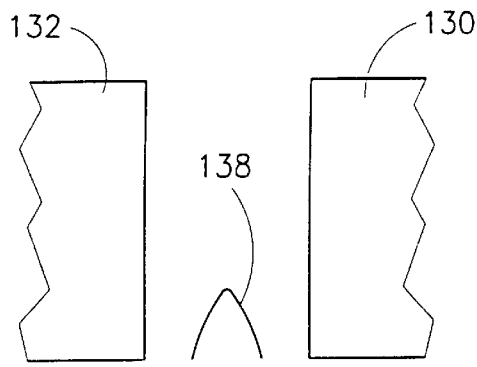
FIGS. 24(b)–(d) are schematic cross-sections through different stages of the process of FIG. 24(a)
Figure 24C:
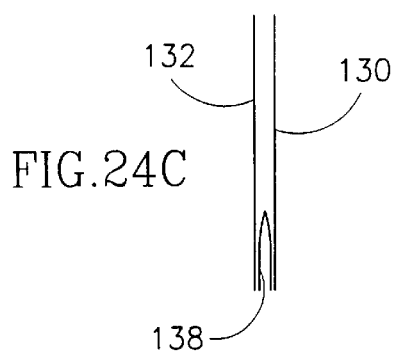
Figure 24D:
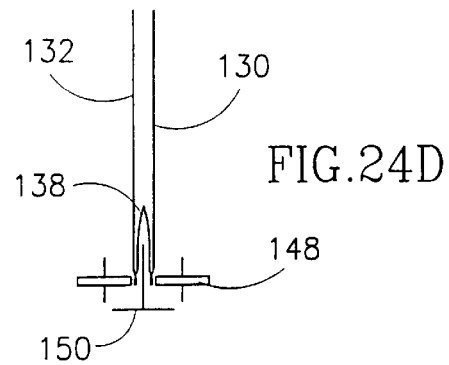
Figure 25B:
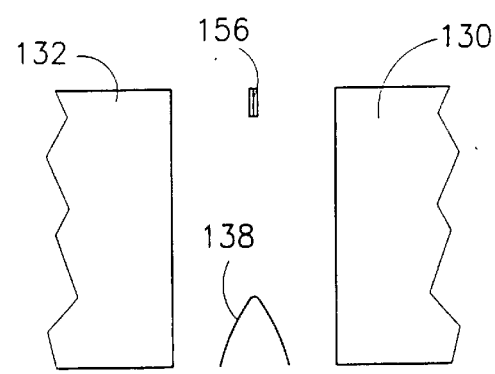
FIGS. 25(b)–(d) are schematic cross-sections through different stages of the process of FIG. 25(a)
Figure 25C:
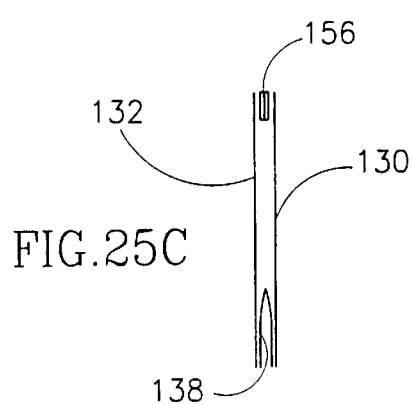
Figure 25D:
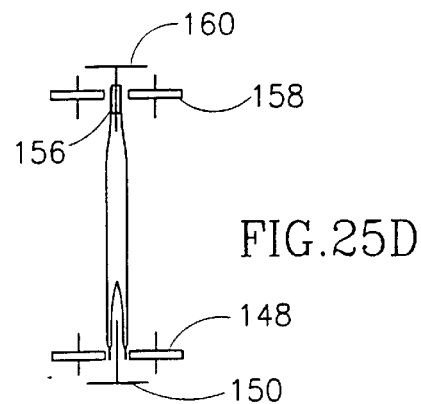
Figure 26A:
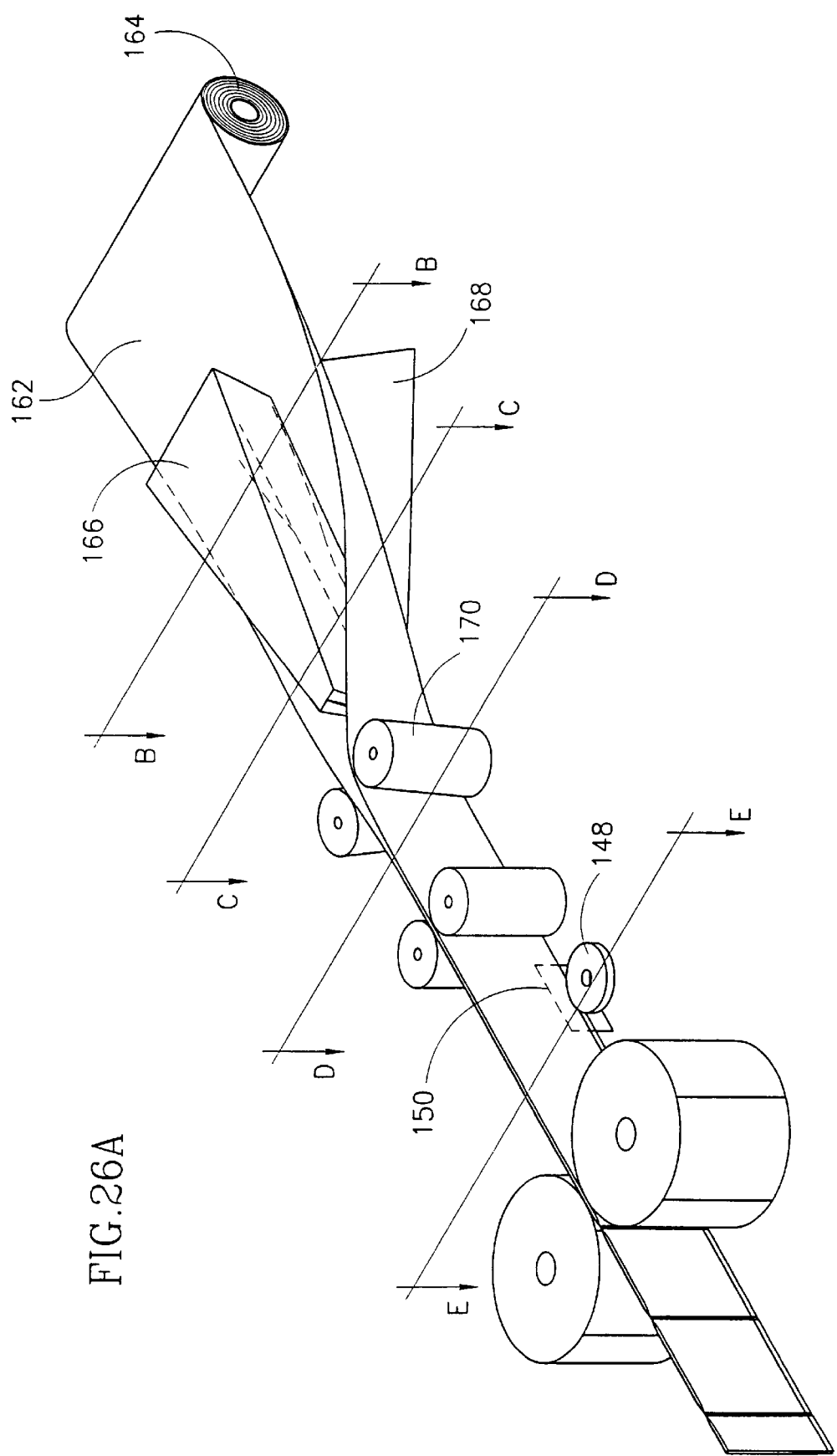
FIG. 26(a) is a perspective view depicting the manufacture of a pouch according to still a different process, for the manufacture of a container according to the present invention.
Figure 26B:
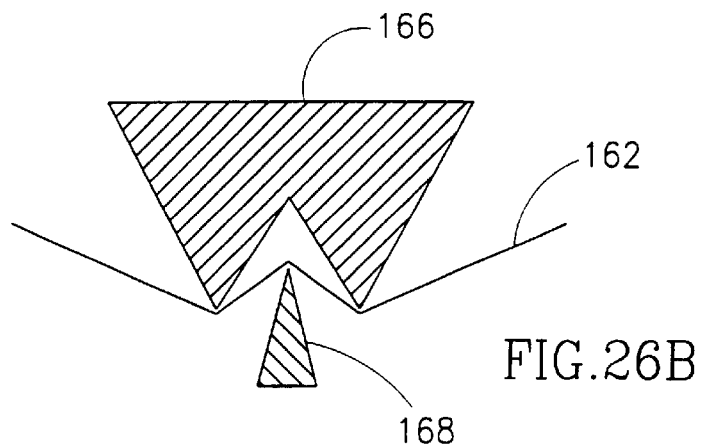
FIGS. 26(b)–(e) are schematic cross-sections through different stages of the process of FIG. 26(a).
Figure 26C:
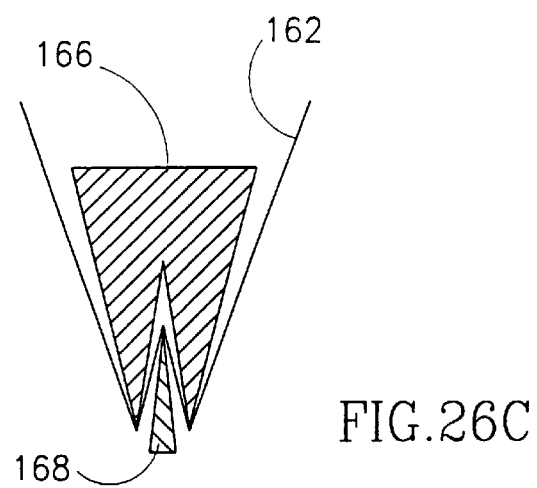
Figures 26D, 26E:
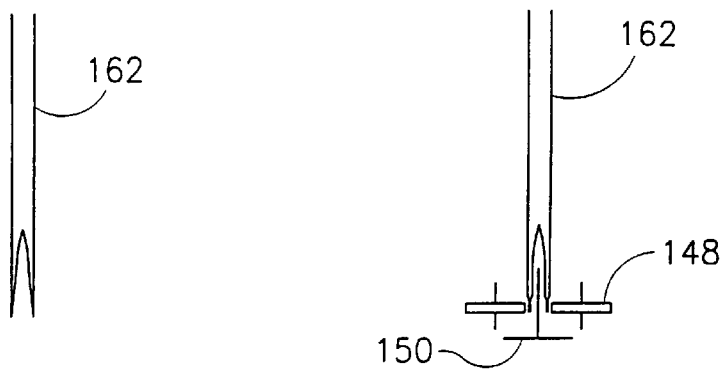

The central portion of the film is then sucked into a recess 109 at an edge of a triangular-shaped forming member 110 (better seen in FIGS. 23(b) and (e)).

The films positioned by pulleys 112 and 114 pass over a blade 116, whereby the films are cut along their bottom edge and the cross-section of the films now resemble that presented in FIG. 1 of the drawings.

Two hot rollers 118 are positioned juxtaposed one another with a non-adhering plate (e.g. Teflon™ or silicon) 120 positioned therebetween. As the films travel between the rollers 118, the bottom edges 4' and 5' of the sheets are welded and as the laminate passes between rollers 122 it is welded by the hot welding ribs 124, whereby a plurality of joined pouches 126 are produced, which are then separated at a cutting station 128 as can be understood.

In FIGS. 24(a) to (d), two sheets 130 and 132, having their facing faces coated with a heat weldable material, are dispensed from unwinding rollers 134 and 136, respectively. A third sheet 138, having both faces heat weldable, is dispensed from unwinding roller 140.

Before approaching the facing films 130 and 132, the third film 138 is folded in two by a grooved triangular member 142 as explained with reference to FIG. 23(b). The folded sheet 138 (forming the base sheet) and sheets 130 and 132 (forming the walls) then progress via positioning pulleys 144 and 146 and their bottom edges are welded by welding rollers 148, with an un-weldable plate 150 introduced therebetween as already explained.

Then the laminate is welded by welding ribs 152 of rollers 154 whereby the side edges of the pouches are formed. Finally the pouches 126' are separated from one another as explained hereinabove.

FIGS. 25(a) to (d) illustrate a process essentially similar to that of FIGS. 24(a) to (d), with the exception that a reclosable zipper-like strap 136 is welded to the top edges of the pouch by welding rollers 158 and a nonwelding plate 160 introduced between the sheets. The pouches and containers later prepared by this process can thus be closed and opened many times as can be appreciated.

FIGS. 26(a) to (e) illustrate how a pouch useful in preparing a container according to the present invention may be prepared from a single sheet 162 having both faces heat weldable and released from an unwinding roller 164. The film sheet 162 travels between a block member 166 having an essentially W-like cross-section and between a triangular cross-shaped gliding member 168, gradually forming the film to a shape as seen in FIGS. 26(*b*) and (*c*), so that when the film reaches the positioning pulleys 170 it has already obtained the configuration illustrated in FIG. 1 (with the dashed line). From here on the process continues as already explained with reference to FIGS. 23 to 25.

It should be obvious to a person versed in the art that any combination of the above embodiments may be carried out mutatis mutandis.

I claim:

1. A container having a base with a front edge, a rear edge and side edges, and walls extending upwardly therefrom; the base being generally rectangular and being made of a film having an inner face and an outer face, said inner and outer faces being heat weldable, and the walls being made of a film having an inner face and an outer face, with at least said inner face being heat weldable; said base and said walls of the container being constructed from a front sheet having a bottom edge, a top edge and lateral edges, a rear sheet having a bottom edge, a top edge and lateral edges, and a bottom sheet; the bottom sheet being foldable along a midline thereof with first and second flaps extending downwards from the midline, said flaps each having a bottom edge and lateral edges, and wherein the bottom edge of the first flap is joined to the bottom edge of the front sheet and the bottom edge of the second flap is joined to the bottom edge of the rear sheet; wherein the lateral edges of the front sheet and the rear sheet are welded to one another with bottom portions of the lateral edges of the front and rear sheets sandwiching lateral edges of the first and second flaps; wherein the bottom sheet is unfoldable into a substantially rectangular shape to form said base, with central parts of the bottom edges of the flaps of the bottom sheet forming the front and rear edges of the base and with peripheral portions of the bottom sheet forming two overlapping triangular portions having lower edges thereof defining the side edges of the base, and side walls extending from said side edges of said base with the welded lateral edges of the front and rear sheets being at about a midline of the side walls; said container being fixed by welding the two overlapping triangular portions; and stiff elongated studs composed at least in part of a heat weldable material, said studs being welded to the walls of the container and projecting from a reinforcement element welded to a region of said container, said region being selected from the group consisting of a top of said container or a bottom of said container, and wherein the studs extend substantially an entire length of the container.

2. A container having a base with a front edge, a rear edge and side edges, and walls extending upwardly therefrom; the base being generally rectangular and being made of a film having an inner face and an outer face, said inner and outer faces being heat weldable, and the walls being made of a film having an inner face and an outer face, with at least said inner face being heat weldable; said base and said walls of the container being constructed from a front sheet having a bottom edge, a top edge and lateral edges, a rear sheet having a bottom edge, a top edge and lateral edges, and a bottom sheet; the bottom sheet being foldable along a midline thereof with first and second flaps extending downwards from the midline, said flaps each having a bottom edge and lateral edges, and wherein the bottom edge of the first flap is joined to the bottom edge of the front sheet and the bottom edge of the second flap is joined to the bottom edge of the rear sheet; wherein the lateral edges of the front sheet and the rear sheet are welded to one another with bottom portions of the lateral edges of the front and rear sheets sandwiching lateral edges of the first and second flaps; wherein the bottom sheet is unfoldable into a substantially rectangular shape to form said base, with central parts of the bottom edges of the flaps of the bottom sheet forming the front and rear edges of the base and with peripheral portions of the bottom sheet forming two overlapping triangular portions having lower edges thereof defining the side edges of the base, and side walls extending from said side edges of said base with the welded lateral edges of the front and rear sheets being at about a midline of the side walls; said container being fixed by welding the two overlapping triangular portions; and stiff elongated studs composed at least in part of a heat weldable material, said studs being welded to the walls of the container, and wherein the elongated studs each have a form defined by one or more curves, and wherein the walls of the container acquire a shape defined by the studs.

3. A container having a base with a front edge, a rear edge and side edges, and walls extending upwardly therefrom; the base being generally rectangular and being made of a film having an inner face and an outer face, said inner and outer faces being heat weldable, and the walls being made of a film having an inner face and an outer face, with at least said inner face being heat weldable; said base and said walls of the container being constructed from a front sheet having a bottom edge, a top edge and lateral edges, a rear sheet having a bottom edge, a top edge and lateral edges, and a bottom sheet; the bottom sheet being foldable along a midline thereof with first and second flaps extending downwards from the midline, said flaps each having a bottom edge and lateral edges, and wherein the bottom edge of the first flap is joined to the bottom edge of the front sheet and the bottom edge of the second flap is joined to the bottom edge of the rear sheet; wherein the lateral edges of the front sheet and the rear sheet are welded to one another with bottom portions of the lateral edges of the front and rear sheets sandwiching lateral edges of the first and second flaps; wherein the bottom sheet is unfoldable into a substantially rectangular shape to form said base, with central parts of the bottom edges of the flaps of the bottom sheet forming the front and rear edges of the base and with peripheral portions of the bottom sheet forming two overlapping triangular portions having lower edges thereof defining the side edges of the base, and side walls extending from said side edges of said base with the welded lateral edges of the front and rear sheets being at about a midline of the side walls; said container being fixed by welding the two overlapping triangular portions; and a reinforcement box-like stiff structure welded within the container.

4. A container having a base with a front edge, a rear edge and side edges, and walls extending upwardly therefrom; the base being generally rectangular and being made of a film having an inner face and an outer face, said inner and outer faces being heat weldable, and the walls being made of a film having an inner face and an outer face, with at least said inner face being heat weldable; said base and said walls of the container being constructed from a front sheet having a bottom edge, a top edge and lateral edges, a rear sheet having a bottom edge, a top edge and lateral edges, and a bottom sheet; the bottom sheet being foldable along a midline thereof with first and second flaps extending downwards from the midline, said flaps each having a bottom edge and lateral edges, and wherein the bottom edge of the first flap is joined to the bottom edge of the front sheet and the bottom edge of the second flap is joined to the bottom edge of the rear sheet; wherein the lateral edges of the front sheet and the rear sheet are welded to one another with bottom portions of the lateral edges of the front and rear sheets sandwiching lateral edges of the first and second flaps; wherein the bottom sheet is unfoldable into a substantially rectangular shape to form said base, with central parts of the bottom edges of the flaps of the bottom sheet forming the front and rear edges of the base and with peripheral portions of the bottom sheet forming two overlapping triangular portions having lower edges thereof defining the side edges of the base, and side walls extending from said side edges of said base with the welded lateral edges of the front and rear sheets being at about a midline of the side walls; said container being fixed by welding the two overlapping triangular portions; and a skirt extending around said bottom sheet forming said base, said skirt being formed by the welding of said container, and wherein said skirt is folded over a bottom face of the bottom sheet and welded thereto.

5. A process for the manufacture of a container, the container having a generally rectangular base and walls extending therefrom, the base being made of a film having an inner face and an outer face, with both of said faces being heat weldable, and the walls being made of a film having an inner face and an outer face, with at least said inner face of said film forming said walls being heat weldable, the process comprising:

(a) constructing said container from a front sheet having a bottom edge and lateral edges, a rear sheet having a bottom edge and lateral edges, and a bottom sheet, the bottom sheet being folded along a midline thereof with first and second flaps extending downwards from the midline, said flaps each having a bottom edge and lateral edges, and wherein the bottom edge of the first flap is joined to the bottom edge of the front sheet and the bottom edge of the second flap is joined to the bottom edge of the rear sheet; and welding lateral edges of the front and rear sheet to one another with bottom portions of the lateral edges of the front and rear sheets sandwiching lateral edges of the first and second flaps;

(b) unfolding the bottom sheet such that a central portion of the sheet assumes a rectangular shape and two peripheral portions of the sheet form two overlapping triangular portions:

(c) welding the two overlapping triangular portions to one another or welding a peripheral triangular portion of the two with juxtaposed inner face of a juxtaposed sheet; and (d) welding a reinforcement box-like stiff structure within the container.

6. A process for the manufacture of a container, the container having a generally rectangular base and walls extending therefrom, the base being made of a film having an inner face and an outer face, with both of said faces being heat weldable, and the walls being made of a film having an inner face and an outer face, with at least said inner face of said film forming said walls being heat weldable, the process comprising:

(a) constructing said container from a front sheet having a bottom edge and lateral edges, a rear sheet having a bottom edge and lateral edges, and a bottom sheet, the bottom sheet being folded along a midline thereof with first and second flaps extending downwards from the midline, said flaps each having a bottom edge and lateral edges, and wherein the bottom edge of the first flap is joined to the bottom edge of the front sheet and the bottom edge of the second flap is joined to the bottom edge of the rear sheet; and welding lateral edges of the front and rear sheet to one another with bottom portions of the lateral edges of the front and rear sheets sandwiching lateral edges of the first and second flaps;

(b) unfolding the bottom sheet such that the a central portion of the sheet assumes a rectangular shape and two peripheral portions of the sheet form two overlapping triangular portions:

(c) welding the two overlapping triangular portions to one another or welding a peripheral triangular portion of the two with juxtaposed inner face of a juxtaposed sheet; and (d) folding a skirt formed by the welding of said container over a bottom face of the bottom sheet and welding the folded skirt to said bottom face of said bottom sheet.

* * * * *